(12) United States Patent
Suenaga et al.

(10) Patent No.: US 6,982,944 B2
(45) Date of Patent: Jan. 3, 2006

(54) OPTICAL RECORDING MEDIUM HAVING RELATION BETWEEN GROOVE DEPTHS AND PIT DEPTHS

(75) Inventors: Masashi Suenaga, Moriya (JP); Yusuke Takahashi, Moriya (JP)

(73) Assignee: Hitachi Maxell, Ltd., Ibaraki (JP)

( * ) Notice: Subject to any disclaimer, the term of this patent is extended or adjusted under 35 U.S.C. 154(b) by 111 days.

(21) Appl. No.: 10/390,724

(22) Filed: Mar. 19, 2003

(65) Prior Publication Data

US 2003/0193882 A1    Oct. 16, 2003

(30) Foreign Application Priority Data

Mar. 20, 2002 (JP) .............................. 2002-079005
Jun. 7, 2002 (JP) .............................. 2002-167462

(51) Int. Cl.
*G11B 11/00* (2006.01)

(52) U.S. Cl. .............................. 369/275.4; 369/13.54; 369/13.55; 428/64.4

(58) Field of Classification Search ............. 369/275.4, 369/275.2, 275.3, 277, 278, 279, 13.55, 13.54; 428/64.4, 64.1, 64.3
See application file for complete search history.

(56) References Cited

U.S. PATENT DOCUMENTS

| 5,602,824 | A | * | 2/1997 | Ooki et al. ............... 369/275.4 |
| 5,926,446 | A | * | 7/1999 | Shimizu .................... 369/275.4 |
| 5,946,288 | A | * | 8/1999 | Ogawa ....................... 369/275.4 |
| 6,407,979 | B1 | * | 6/2002 | Matsumoto et al. ..... 369/275.4 |
| 6,673,411 | B2 | * | 1/2004 | Koide et al. ............. 369/275.4 |
| 6,704,274 | B2 | * | 3/2004 | Takahata et al. ......... 369/275.4 |
| 6,762,989 | B2 | * | 7/2004 | Hirokane et al. ........ 369/275.4 |
| 6,819,650 | B2 | * | 11/2004 | Deno et al. ............... 369/275.4 |

FOREIGN PATENT DOCUMENTS

| JP | A 8-129780 | 5/1996 |
| JP | A 2000-21024 | 1/2000 |
| JP | A 2001-67733 | 3/2001 |
| JP | A 2001-351268 | 12/2001 |
| JP | A 2002-216364 | 8/2002 |
| JP | A 2002-237093 | 8/2002 |

* cited by examiner

*Primary Examiner*—Tan Dinh
(74) *Attorney, Agent, or Firm*—Oliff & Berridge PLC

(57) ABSTRACT

An optical information-recording medium having in-groove pits, which is excellent in recording and reproduction characteristics and tracking characteristics, is provided. A method for producing the optical information-recording medium is also provided. Further, a stamper to be used for producing a substrate for the optical information-recording medium and a method for producing the same are also provided. In the optical information-recording medium of the present invention, the in-groove pits, which have flat bottom surfaces, are arranged on a groove which has a flat bottom surface. Therefore, it is possible to increase the difference between a height position of an interface between a recording layer and a reflective layer at a groove portion formed with the recording layer containing an organic dye and a height position of the interface between the recording layer and the reflective layer at an in-groove pit portion, as compared with an optical information-recording medium in which a wide-width portion and a narrow-width portion are formed on a groove. Accordingly, information, which is recorded on the in-groove pits, can be reproduced at a high modulation factor and at a low jitter.

7 Claims, 24 Drawing Sheets

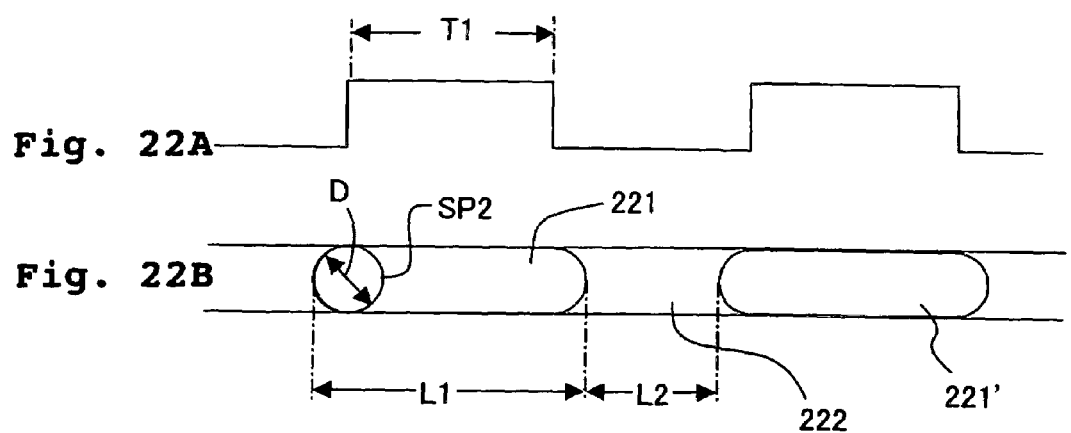
PRIOR ART

OPTICAL RECORDING MEDIUM HAVING RELATION BETWEEN GROOVE DEPTHS AND PIT DEPTHS

BACKGROUND OF THE INVENTION

1. Field of the Invention

The present invention relates to an optical information-recording medium and a method for producing the same as well as a stamper to be used for producing a substrate of the optical information-recording medium and a method for producing the same. In particular, the present invention relates to an optical information-recording medium on which media information such as a name of manufacturer and information concerning copyright protection measures is recorded on a groove in a form of prepits and a method for producing the same as well as a stamper to be used for producing a substrate thereof and a method for producing the same.

2. Related Art

In recent years, DVD (digital versatile disk), which has a recording capacity several times that of CD (compact disk), is widely used as an information-recording medium, for example, for images and voices. In relation to DVD, those having been commercially available as products are DVD-R (write-once digital versatile disk) on which information can be recorded by the user only once and DVD-RW (rewritable digital versatile disk) on which information is rewritable. DVD-R and DVD-RW are considered to come into widespread use as large capacity information-recording media from now on.

Usually, in the case of DVD-R, predetermined information (hereinafter referred to as "media information") including, for example, the disk manufacturer information, the information concerning copyright protection measures, and the output of laser beam to be used for recording and reproducing information on the disk is previously recorded on the disk. The media information as described above is recorded by modifying the recording layer by means of, for example, irradiation with light by using a recording apparatus at the final stage of the disk production steps.

On the other hand, Japanese Patent Application Laid-open Nos. 2000-21024, 2001-67733, and 2002-216364 disclose methods for recording the information such as media information in a form of emboss pits (hereinafter referred to as "in-groove pits") on a groove of a substrate when the substrate of the disk is produced, without recording the information such as media information in the recording layer as described above. FIG. 21 shows a part of the substrate produced by using the method as mentioned above. FIG. 21A shows a partial magnified plan view illustrating the substrate, which schematically depicts an area (hereinafter referred to as "in-groove pit area") in which the in-groove pits are formed. FIGS. 21B and 21C show a cross section taken along a line A'—A' and a cross section taken along a line B'—B' shown in FIG. 21A respectively. As shown in FIG. 21B, in the case of this substrate, the depth dp", which ranges to a bottom surface (lowermost surface) 217a of the in-groove pit 217 on the basis of a land surface 211a of the substrate 211 formed with lands and grooves, is formed to be deeper than the depth dg" which ranges to a bottom surface (lowermost surface) 215a of the groove 215 on the basis of the land surface 211a as well. Accordingly, when a recording layer and a reflective layer are formed on the pattern formation surface of the substrate 211 to manufacture an optical information-recording medium, the difference appears in surface height of each of the layers between the portion at which the in-groove pit 217 is formed and the groove portion at which the in-groove pit 217 is not formed. Data such as media information can be recorded on the groove by utilizing the difference in depth between the in-groove pit portion and the groove portion.

The optical information-recording medium, which uses the substrate as described above, is produced as follows. A photoresist, which is formed to have a uniform thickness on a surface of a master disk, is irradiated with a laser beam having a constant intensity to effect the exposure with a pattern corresponding to the groove. Further, the exposure is effected with a pattern corresponding to the in-groove pits by using a laser beam which is intensity-modulated to have an exposure intensity at a level higher than that of the exposure intensity of the constant intensity described above. The pattern corresponding to the groove and the pattern corresponding to the in-groove pits can be formed by performing the exposure by continuously switching the exposure intensity. Alternatively, the pattern corresponding to the in-groove pits may be formed afresh by performing the exposure after once forming the pattern corresponding to the groove by performing the exposure. Subsequently, the exposed master disk is subjected to a development treatment to form a desired photoresist pattern corresponding to the groove and the in-groove pits on the master disk. Subsequently, an etching treatment such as RIE is applied to the photoresist pattern formation surface of the master disk to form the desired pattern corresponding to the groove and the in-groove pits on the surface of the master disk. Subsequently, a stamper is manufactured by using the master disk which has the pattern formed on the surface. Further, substrates are replicated by using the stamper. A variety of layers including, for example, a recording film, are formed on the pattern formation surface of the replicated substrate. Thus, the optical information-recording medium is successfully produced.

However, when the portion corresponding to the in-groove pits is subjected to the exposure by means of the master disk-exposing method as described above, the exposure is performed for a period of time T1 corresponding to the pit length of the in-groove pit to be formed as shown in FIGS. 22A and 22B. Therefore, the length L1 in the track direction of the in-groove pit formation portion 221 formed by the exposure of the photoresist is lengthened by an amount corresponding to the diameter D of the light spot SP2 radiated onto the photoresist on the master disk. Therefore, in relation to the space 222 to be arranged between the in-groove pit formation portion 221 and another in-groove pit formation portion 221' adjoining in the track direction, the length L2 in the track direction of the space 222 is shortened by the amount as described above. Therefore, the jitter of the signal reproduced from the in-groove pits to be read from the optical information-recording medium is increased.

Usually, as shown in FIG. 23, the following technique is known for the optical information-recording medium such as DVD-R in order to suppress the jitter of the reproduced signal obtained from the prepits. That is, notches 231a are periodically provided on parts of the groove 231. The prepits 232 are separately formed on the notch portions 231a. When a master disk, which is used to produce the optical information-recording medium as described above, is subjected to the exposure, the exposure amount, which is required to perform the exposure of a pattern corresponding to the prepits 232, can be adjusted irrelevant to the exposure amount which is required to perform the exposure of the pattern corresponding to the groove 231. Accordingly, it is possible to suppress or avoid the redundancy of the prepit length, for example, by forming the prepit to have a small size by lowering the exposure intensity when the prepit formation portion is subjected to the exposure, or by curtailing the exposure time interval for the prepit formation portion by a predetermined period of time before and after the exposure (at the exposure start end and at the exposure termination end) to make the adjustment so that the exposure time interval is shortened.

However, in the case of the optical information-recording medium in which the in-groove pits are formed, when the pit size is decreased by merely lowering the exposure intensity for the in-groove pit formation portion during the exposure of the master disk or when the exposure time for the in-groove pit formation portion is shortened by performing the curtailing before and after the exposure, then the exposure amount is insufficient at the end of the in-groove pit formation portion in the track direction. Therefore, the photoresist disposed at the portion is not subjected to the exposure to arrive at the master disk surface. For this reason, it is impossible to accurately form the desired photoresist pattern on the master disk. Further, as shown in FIG. 24, in the case of the master disk in which the surface etching is performed in accordance with such a photoresist pattern, the angle of inclination $\theta_2$ of the wall surface 242b of the in-groove pit formation portion 242 confronted in the track direction, which is measured on the basis of the bottom surface 242a of the in-groove pit formation portion 242, is decreased. The angle of inclination of the wall surface of the in-groove pit confronted in the track direction is also decreased on a substrate for the optical information-recording medium manufactured on the basis of the master disk, in the same manner as in the master disk described above. Therefore, the modulation factor of the reproduced signal obtained from the in-groove pits is lowered.

In the optical information-recording medium in which the recording layer containing an organic dye is formed on the pattern formation surface of the substrate, the difference appears in height position of the interface between the recording layer and the reflective layer due to the difference in width of the pattern formed on the substrate. The height position of the interface between the recording layer and the reflective layer relative to the wide-width groove is lower than that relative to the narrow-width groove. As a result, the difference arises between the optical path length of the laser beam at the wide-width groove portion and the optical path length of the laser beam at the narrow-width groove portion. Japanese Patent Application Laid-open No. 2001-351268 discloses a method for reproducing information such as media information by utilizing the difference in optical path length. However, the depth of the wide-width groove is the same as that of the narrow-width groove formed on the substrate which is used in this method.

However, in the optical information-recording medium described above, it is practically impossible to bring about any difference in optical path length of the laser beam to such an extent that a certain signal modulation factor, which is sufficient to reproduce information, is obtained, although the slight difference appears in height position of the interface between the recording layer and the reflective layer between the wide-width portion and the narrow-width portion of the groove. It was unsuccessful to obtain any sufficient difference in optical path length even by variously changing, for example, the dimension ratio between the wide-width portion and the narrow-width portion of the groove, the viscosity of the recording layer material, and the condition of the rotary driving of the substrate. Further, it is difficult to narrow the track pitch in the case of the optical information-recording medium on which information such as media information is recorded by utilizing the wide-width portion and the narrow-width portion of the groove as described above. Therefore, such an optical information-recording medium is especially disadvantageous to increase the recording capacity of the optical information-recording medium by narrowing the track pitch.

Japanese Patent Application Laid-open Nos. 8-129780 and 2002-237093 disclose optical information-recording media in which the film thickness of the recording layer (dye layer) formed on the substrate differs depending on the depth of the pit or the groove formed on the substrate surface. However, any one of the patent documents refers to an optical information-recording medium having in-groove pits.

An object of the present invention is to provide an optical information-recording medium having in-groove pits excellent in recording and reproduction characteristics and tracking characteristics, and a method for producing the same. Another object of the present invention is to provide a stamper to be used for producing a substrate for the optical information-recording medium and a method for producing the same.

SUMMARY OF THE INVENTION

According to a first aspect of the present invention, there is provided an optical information-recording medium comprising:

a substrate which includes a land, a groove having a flat bottom surface, and in-groove pits having flat bottom surfaces, respectively, formed on one surface of the substrate;

a recording layer which contains an organic dye and is formed on the one surface; and a reflective layer which is formed on the recording layer, wherein:

dp/dg<Tp/Tg is satisfied provided that dg represents a depth from a land surface of the substrate to the bottom surface of the groove, dp represents a depth from the land surface of the substrate to the bottom surface of the in-groove pit, Tg represents a recess depth of the recording layer from an interface between the recording layer and the reflective layer on the land surface to the interface between the recording layer and the reflective layer at the groove, and Tp represents a recess depth of the recording layer from the interface between the recording layer and the reflective layer on the land surface to the interface between the recording layer and the reflective layer at the in-groove pit.

In the optical information-recording medium according to the present invention, the in-groove pits, which have the flat bottom surfaces, are arranged on the groove which has the flat bottom surface. Therefore, it is possible to increase the difference between the height position of the interface between the recording layer and the reflective layer at the groove portion at which the recording layer containing the organic dye is formed and the height position of the interface between the recording layer and the reflective layer at the in-groove pit portion, as compared with an optical information-recording medium in which the wide-width portion and the narrow-width portion are formed on the groove. Accordingly, information, which is recorded on the in-groove pits, can be reproduced at a high modulation factor and at a low jitter. Further, it is possible to improve the recording density by narrowing the track pitch, because the wide-width portion is not provided on the groove. In the optical information-recording medium of the present invention, the recording layer containing the organic dye is formed so that dp/dg<Tp/Tg is satisfied by the relationship between the ratio dp/dg between the depth (hereinafter referred to as "in-groove pit depth") dp ranging from the land surface of the substrate to the bottom surface of the in-groove pit and the depth (hereinafter referred to as "groove depth") dg ranging from the land surface of the substrate to the bottom surface of the groove and the ratio Tp/Tg between the recess depth Tp of the recording layer at the in-groove pit and the recess depth Tg of the recording layer at the groove. Accordingly, even when the in-groove pit depth dp and the groove depth dg are not formed to have such dimensions that a predetermined signal modulation factor and a radial push-pull signal are obtained, it is possible to increase the difference between the optical path length of the light beam passing through the groove and the optical path length of the light beam passing through the in-groove pit. Therefore, the in-groove pit depth dp can be made shallow as compared with the groove depth dg. Therefore, it is easy to perform the master disk cutting and the formation of the substrate. Further, it is possible to reduce the production cost of the optical information-recording medium. In particular, it is preferable that 1.15<(Tp/Tg)/(dp/dg) is satisfied.

In the present invention, it is desirable that the ratio Tp/Tg between the recess depth Tg and the recess depth Tp satisfies $1.6 \leq Tp/Tg \leq 2.0$. Accordingly, information, which is recorded on the in-groove pits, can be reproduced at a high modulation factor and at a low jitter. In the optical information-recording medium of the present invention, for example, it is possible to obtain a modulation factor of not less than 60%, and it is possible to suppress the jitter to be not more than 8%. Therefore, it is possible to obtain reproduction characteristics sufficient for the practical use. Further, it is desirable that the groove depth dg satisfies dg>λ/4n provided that k represents a wavelength of a light beam to be used for recording or reproduction on the optical information-recording medium, and n represents a refractive index of the substrate. In general, the groove can be detected at the highest contrast when the difference in optical path length between the light beam transmitted through the groove portion and the light beam transmitted through the land portion is λ/4n. In the case of the optical information-recording medium in which the organic dye material is used for the recording layer, the situation of lamination of the recording layer differs between the groove portion and the land portion. Therefore, in ordinary cases, the difference in optical path length between the light beam transmitted through the groove portion and the light beam transmitted through the land portion is not more than λ/4n, in which it is impossible to detect the groove at any satisfactory contrast. The optical information-recording medium of the present invention is formed so that the groove depth dg satisfies dg>λ/4n. Therefore, it is easy to adjust the condition of lamination of the recording layer so that the difference in optical path between the light beam transmitted through the groove portion and the light beam transmitted through the land portion is enlarged to λ/4n. Accordingly, the groove portion and the land portion can be detected at the highest contrast.

According to a second aspect of the present invention, there is provided an optical information-recording medium comprising:

a substrate which includes a land, a groove having a flat bottom surface, and in-groove pits having flat bottom surfaces, respectively, formed on one surface of the substrate;

a reflective layer which is formed on the one surface;

a recording layer which contains an organic dye and is formed on the reflective layer;

a protective layer which is formed on the recording layer; and a cover layer which is formed on the protective layer, wherein:

dp/dg<Tp'/Tg' is satisfied provided that dg represents a depth from a land surface of the substrate to the bottom surface of the groove, dp represents a depth from the land surface of the substrate to the bottom surface of the in-groove pit, Tg' represents a recess depth of the recording layer from an interface between the recording layer and the protective layer on the land surface to the interface between the recording layer and the protective layer at the groove, and Tp' represents a recess depth of the recording layer from the interface between the recording layer and the protective layer on the land surface to the interface between the recording layer and the protective layer at the in-groove pit.

In the optical information-recording medium according to the present invention, information is recorded and reproduced by allowing the light beam to come thereinto from the side of the cover layer. It is possible to obtain the function and effect equivalent to those obtained by the optical information-recording medium according to the first aspect, by satisfying the relationship of dp/dg<Tp'/Tg' described above.

In the present invention, it is desirable that the ratio Tp'/Tg' between the recess depth Tg' and the recess depth Tp' satisfies $1.6 \leq Tp'/Tg' \leq 2.0$. Further, it is desirable that the depth dg satisfies dg>λ/4n provided that λ represents a wavelength of a light beam to be used for recording or reproduction on the optical information-recording medium, and n represents a refractive index of the cover layer.

In the optical information-recording medium according to the aspect described above, it is desirable that the ratio dp/dg between the groove depth dg and the in-groove pit depth dp satisfies $1.4 \leq dp/dg \leq 1.7$. In order to obtain a predetermined signal modulation factor and a radial push-pull signal, it is preferable that the ratio between the optical path length of the light beam passing through the groove and the optical path length of the light beam passing through the in-groove pit is about 1.6 to 2.0. However, in the optical information-recording medium of the present invention, it is possible to enlarge the difference between the optical path length through the groove and the optical path length through the in-groove pit by forming the recording layer by using the organic dye material. Therefore, even when the ratio dp/dg between the groove depth dg and the in-groove pit depth dp is not more than 1.6 to 2.0 as described above, the ratio between the optical path length of the light beam passing through the groove and the optical path length of the light beam passing through the in-groove pit can be made about 1.6 to 2.0. Accordingly, it is possible to obtain a predetermined signal modulation factor and a radial push-pull signal. Further, information, which is recorded on the in-groove pits, can be reproduced at a high modulation factor and at a low jitter.

According to a third aspect of the present invention, there is provided a method for producing an optical information-recording medium comprising:

a master disk-cutting step of forming, on a master disk, a groove and in-groove pits formed on the groove;

a stamper-manufacturing step of manufacturing a stamper to which a corresponding pattern to the groove and the in-groove pits on the master disk is transferred; and a substrate-replicating step of replicating a substrate from the stamper, and a film-forming step of forming at least one layer on a surface of the replicated substrate, wherein:

the master disk-cutting step includes a groove exposure step of forming a groove pattern on the master disk by exposing a photoresist formed on a surface of the master disk with a light beam having a first exposure intensity and an in-groove pit exposure step of forming an in-groove pit pattern on the master disk by exposing the photoresist formed on the surface of the master disk with a light beam having a second exposure intensity which is higher than the first exposure intensity; and a period of time, in which exposure is performed at a third exposure intensity lower than the first exposure intensity, is provided between the groove exposure step and the in-groove pit exposure step. The corresponding pattern may include not only the same pattern as the master disk but a negative (opposite) pattern to that of the master pattern.

In the method for producing the optical information-recording medium according to the present invention, the period of time (hereinafter referred to as "blank cutting amount" or "blank period"), in which the photoresist is exposed at the third exposure intensity lower than the first exposure intensity, is provided when the groove exposure step and the in-groove pit exposure step are switched. Therefore, the front end and the rear end of the in-groove pit formation portion in the track direction can be exposed with a sufficient exposure amount, as compared with a case in which the exposure time interval for the in-groove pit formation portion is merely curtailed and shortened before and after the exposure. Accordingly, the photoresist, which is formed on the master disk, is sufficiently photosensitized to arrive at the interface between the photoresist and the master disk. Therefore, when the development treatment is performed, it is possible to form a photoresist pattern corresponding to a desired preformat pattern. When the etching is performed on the basis of the photoresist pattern, it is possible to form a large angle of inclination of the wall surface of the in-groove pit formation portion confronted in the track direction. Accordingly, when the stamper is manufactured on the basis of the master disk, and the stamper is used, then it is possible to manufacture the substrate which has the same concave/convex pattern as the preformat pattern formed on the master disk surface. When a variety of layers including, for example, the recording layer and the reflective layer are formed on the substrate, it is possible to produce the optical information-recording medium which makes it possible to perform the reproduction from the in-groove pits at a high modulation factor and at a low jitter.

In the present invention, it is desirable that the period of time, in which the exposure is performed at the third exposure intensity, is set on the basis of values of modulation factor, jitter, and radial push-pull of a reproduced signal obtained from the in-groove pits. It is desirable that the blank period is has a value at which the modulation factor of the reproduced signal obtained from the in-groove pits is the local maximum and the maximum. It is desirable that the blank period has a value at which the value of the jitter of the reproduced signal obtained from the in-groove pits is the local minimum and the minimum. The value of the radial push-pull is lowered as the blank period is increased. Further, the three parameters, i.e., the modulation factor, the jitter, and the radial push-pull of the reproduced signal obtained from the in-groove pits are correlated to one another. Therefore, when the blank period of the optimum condition is selected according to the relationship among them, it is possible to optimize the shapes of the in-groove pits and the spaces. Thus, it is possible to obtain the optical information-recording medium having a high recording density with excellent recording and reproduction characteristics and excellent tracking characteristics. In particular, from a viewpoint to obtain the best three parameters, it is desirable that the period of time (blank period), in which the exposure is performed at the third exposure intensity, is 0.2T provided that T represents a clock cycle. Further, the third exposure intensity may be zero.

According to a fourth aspect of the present invention, there is provided a method for producing a stamper comprising:

a master disk-cutting step of forming, on a master disk, a groove and in-groove pits formed on the groove; and a stamper-manufacturing step of manufacturing a stamper to which a corresponding pattern to the groove and the in-groove pits on the master disk is transferred, wherein:

the master disk-cutting step includes a groove exposure step of forming a groove pattern on the master disk by exposing a photoresist formed on a surface of the master disk with a light beam having a first exposure intensity and an in-groove pit exposure step of forming an in-groove pit pattern on the master disk by exposing the photoresist formed on the surface of the master disk with a light beam having a second exposure intensity which is higher than the first exposure intensity; and a period of time, in which exposure is performed at a third exposure intensity lower than the first exposure intensity, is provided between the groove exposure step and the in-groove pit exposure step. The corresponding pattern may include not only the same pattern as the master disk but a negative (opposite) pattern to that of the master disk.

According to the present invention, there is provided the method for producing the stamper which is used in order to manufacture the substrate for the optical information-recording medium in which the shapes of the spaces and the in-groove pits arranged on the groove are optimized.

In the present invention, it is desirable that the period of time, in which the exposure is performed at the third exposure intensity, is set on the basis of values of modulation factor, jitter, and radial push-pull of a reproduced signal obtained from the in-groove pits. Further, it is desirable that the period of time, in which the exposure is performed at the third exposure intensity, is 0.2T provided that T represents a clock cycle. Further, the third exposure intensity may be zero.

According to a fifth aspect of the present invention, there is provided a stamper manufactured by using the method for producing the stamper according to the fourth aspect, wherein:

a bottom surface of the groove and bottom surfaces of the in-groove pits are flat respectively, and an angle of inclination of a wall surface of the in-groove pit confronted in a track direction is not less than 40 degrees and less than 90 degrees.

When the stamper of the present invention is used, it is possible to manufacture the substrate for optical information-recording medium in which the groove and the in-groove pits to satisfy the foregoing conditions are formed. When the substrate obtained as described above is used, it is possible to obtain a reproduced signal having a good modulation factor from the in-groove pits.

BRIEF DESCRIPTION OF THE DRAWINGS

FIGS. 12A to 12C show cross-sectional shapes and planar shapes in the track direction of 3T signal-recorded portions of respective substrates manufactured by using three types of master disks obtained by performing the cutting while changing the blank period, wherein FIG. 12A shows a case in which the blank period is 0T, FIG. 12B shows a case in which the blank period is 0.2T, and FIG. 12C shows a case in which the blank period is 0.3T.

FIGS. 13A to 13C show cross-sectional shapes and planar shapes in the track direction of optical information-recording media obtained by applying dye recording films respectively to have a film thickness of 200 nm on preformat pattern formation surfaces of respective substrates manufactured by using three types of master disks obtained by performing the cutting while changing the blank period, wherein FIG. 13A shows a case in which there is no blank period, FIG. 13B shows a case in which the blank period is 0.2T, and FIG. 13C shows a case in which the blank period is 0.3T.

FIG. 22A shows a time-dependent change of the exposure intensity of a laser beam to be used for exposing the conventional master disk, and FIG. 22B shows a dimensional relationship of an in-groove pit formation portion and a groove formation portion corresponding thereto.

FIG. 23 shows a pattern of grooves and prepits adopted for conventional DVD-R or the like.

DESCRIPTION OF THE PREFERRED EMBODIMENTS

Embodiments of the present invention will be explained with reference to the drawings. However, the present invention is not limited thereto.

Figure 1:
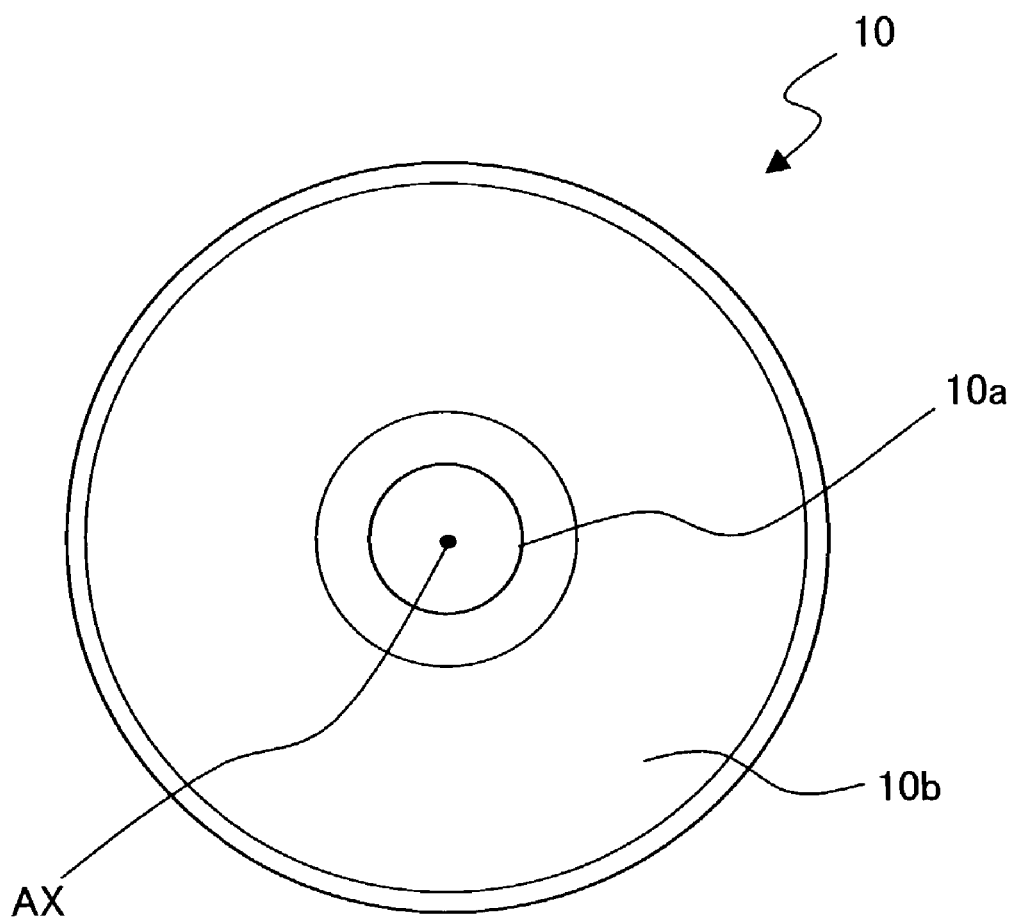
FIG. 1 shows a plan view illustrating an optical information-recording medium according to an embodiment of the present invention.
Figure 2:
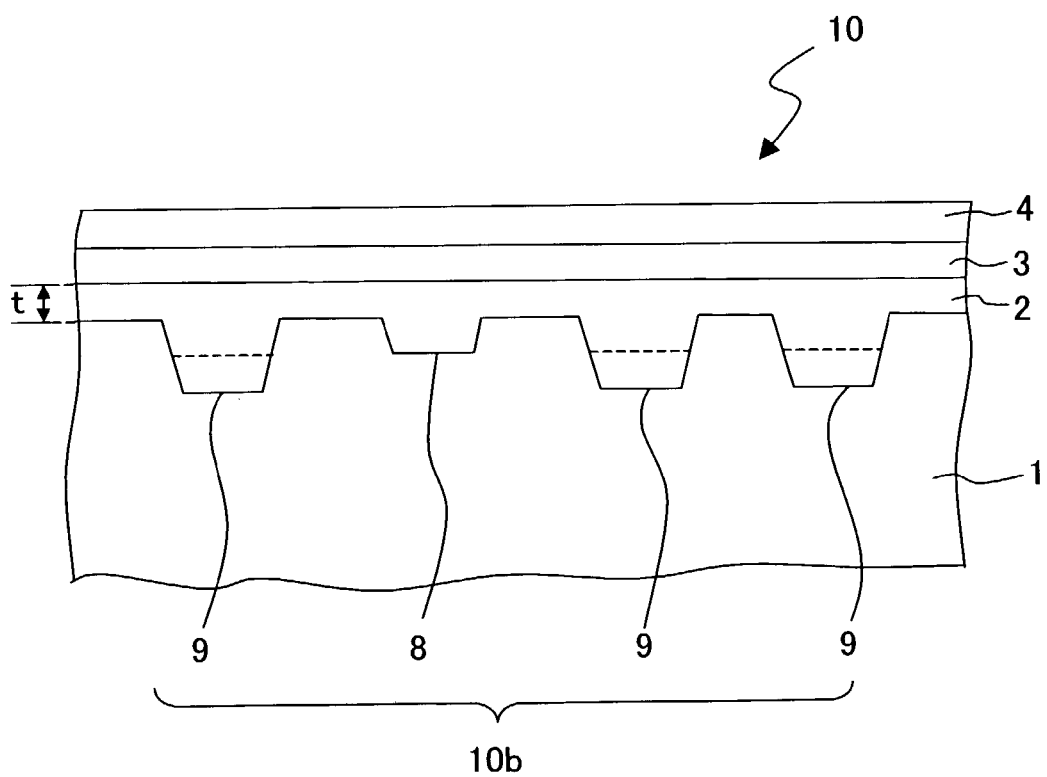
FIG. 2 shows a sectional view illustrating the optical information-recording medium according to the embodiment of the present invention.

As shown in FIG. 1, an optical information-recording medium 10 according to the present invention is formed to have a disk-shaped configuration provided with a center hole 10a on the basis of the center AX. The optical information-recording medium 10 has a substrate 1 in which a preformat pattern 10b including, for example, a groove 8 and in-groove pits 9 is formed on one surface as shown in FIGS. 1 and 2. A recording layer 2, a reflective layer 3, and a protective layer 4 are formed in this order on the surface.

A plastic substrate, which is formed by using the injection molding method, the compression molding method or the injection compression molding method, can be used for the substrate 1. Alternatively, a glass substrate, which is manufactured by using the 2P method (photosensitive resin method), may be used.

Figure 3A:
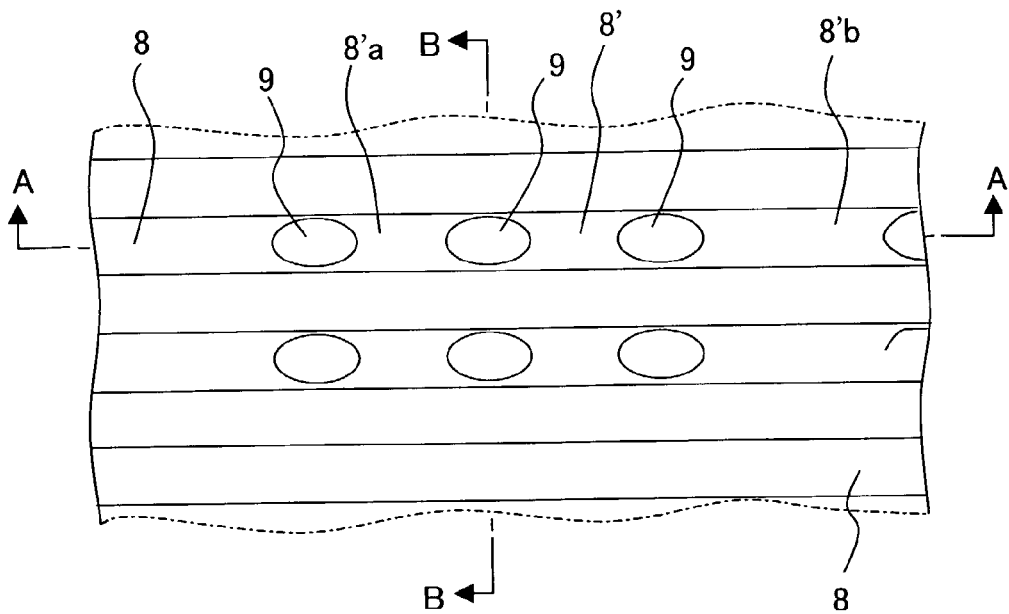
FIG. 3A shows a plan view illustrating a substrate according to the embodiment of the present invention.
Figure 3B:
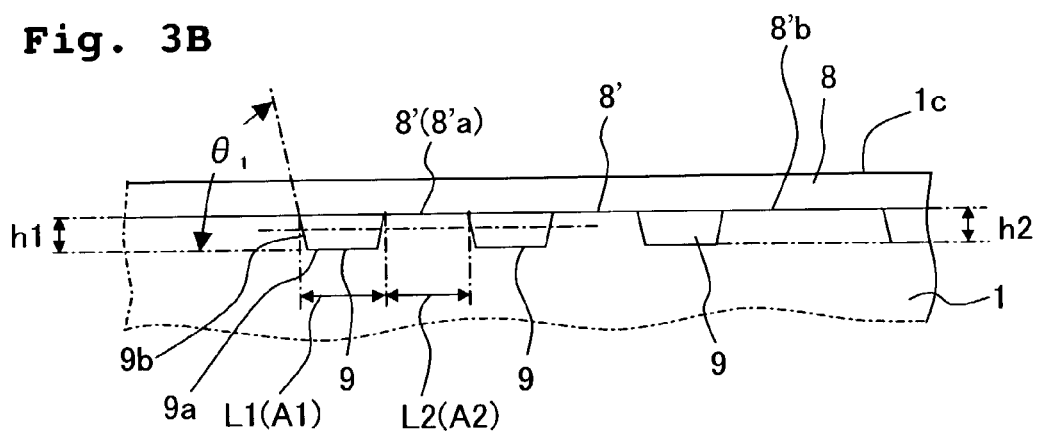
FIG. 3B shows a sectional view taken along a line A—A shown in FIG. 3A.
Figure 3C:
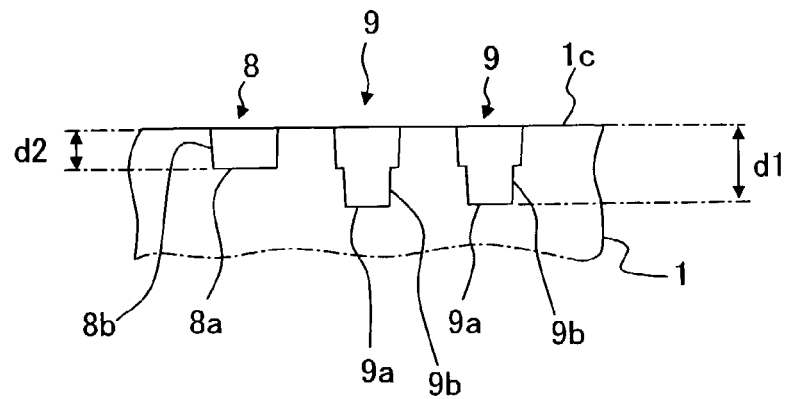
FIG. 3C shows a sectional view taken along a line B—B shown in FIG. 3A.

As shown in FIGS. 3A to 3C, the preformat pattern 10b, which is formed on the substrate 1, comprises the in-groove pits 9 for optically reading information such as address information, and the groove 8 for guiding a recording and reproducing light beam. The in-groove pits 9 are formed on the groove 8. As shown in FIG. 3B, the information such as address information is constituted by arrangement of the in-groove pits 9 and groove portions (hereinafter referred to as "spaces" as well) 8' which are adjacent to the in-groove pits 9 and on which no in-groove pit is formed. The length L1 of the in-groove pit 9 and the length L2 of the space 8' are adjusted to be any one of lengths of 3T to 11T and 14T provided that the clock cycle is T. The preformat pattern 10b is formed in a spiral form or in a concentric form on the basis of the center AX of the optical information-recording medium 10.

The substrate 1 is manufactured by using a master disk having the same concave/convex pattern as the preformat pattern described above on its surface and a stamper obtained with the master disk. The master disk in the present invention is manufactured in accordance with the following master disk-cutting method (lithography). When a photoresist, which is formed on the master disk surface, is exposed with a desired pattern of the in-groove pits, the exposure is performed while the period of time (blank period), in which the exposure intensity of the exposure light beam is temporarily set to be lower than the level at which the exposure is performed with the groove pattern, is provided before and after the exposure period for the in-groove pit pattern. Accordingly, it is possible to avoid the redundancy in the track direction of the in-groove pit pattern depending on the diameter of the laser spot. The blank period is set on the basis of the values of the modulation factor, the jitter, and the radial push-pull of the reproduced signal obtained from the in-groove pits detected from the optical information-recording medium. Subsequently, when the exposed master disk is subjected to a development treatment, the desired photoresist pattern is formed on the master disk. When the etching such as RIE is performed on the basis of the resist pattern, the desired preformat pattern, which is composed of the in-groove pit pattern and the groove pattern, is formed on the surface of the master disk. Both of the in-groove pit pattern and the groove pattern are formed so that the cross-sectional shapes are substantially trapezoidal. The stamper can be obtained by forming a metal layer such as Ni on the preformat pattern formation surface of the master disk manufactured by the method described above, by using, for example, the electroforming method.

As shown in FIGS. 3B and 3C, the in-groove pit 9, which is formed on the substrate 1 obtained as described above, is formed so that a cross-sectional shape is substantially trapezoidal with a flat bottom surface 9a and wall surfaces 9b rising around the bottom surface 9a. In this procedure, the angle of inclination $\theta_1$ of the wall surface 9b of the in-groove pit 9 confronted in the track direction is formed to be not less than 40 degrees and less than 90 degrees with respect to the bottom surface 9a of the in-groove pit 9. The ratio A1/A2 between the shortest in-groove pit length A1 and the shortest space length A2 is 0.8 to 1.2 at the half value portion of the depth of the in-groove pit 9. Further, the ratio h1/h2 between the height h1 of the shortest space 8'a from the bottom surface 9a of the in-groove pit 9 and the height h2 of the space 8'b other than the shortest space is not less than 0.95 and not more than 1.0. On the other hand, as shown in FIG. 3C, the groove 8 is formed so that a cross-sectional shape is substantially trapezoidal with a flat bottom surface 8a and wall surfaces 8b rising around the bottom surface 8a. It goes without saying that the depth d2 ranging from the land surface 1c of the substrate 1 to the bottom surface 8a of the groove 8 is formed to be shallower than the depth d1 ranging from the land surface 1c of the substrate 1 to the bottom surface 9a of the in-groove pit 9. In this specification, the term "substantially trapezoidal" includes mathematically complete trapezoids as well as shapes which have somewhat round portions at the corner at which the bottom surface and the inclined wall surface intersect and at the corner at which the land surface 1c and the inclined wall surface intersect, and shapes which have somewhat distortion on the respective surfaces. In this specification, the term "flat bottom surface" refers to the surface which is substantially parallel to the land surface of the substrate and which has a flat portion defined by widths of at least 50 nm in the track direction and in the radial direction of the substrate respectively.

On the other hand, the recording layer 2, which is formed on the substrate 1, is formed by using, for example, a low melting point metal, a phase-change recording material, a magneto-optical recording material, or an organic dye material in conformity with the system for recording and reproducing information on the optical information-recording medium. With reference to FIG. 2, the recording layer 2 is illustrated as a single layer. However, if necessary, the recording layer 2 may be formed of a laminate of thin films of the same type or different types. For example, in the case of the magneto-optical recording medium, the recording layer can be formed of a laminate comprising a first enhance film composed of an inorganic dielectric, a magneto-optical recording film composed of a perpendicularly magnetizable film, and a second enhance film composed of an inorganic dielectric.

The reflective layer 3, which is formed on the recording layer 2, is formed by using a metal material or an alloy material having a high light reflectance with respect to the recording and reproducing light beam, including, for example, silver or silver alloy, aluminum or aluminum alloy, gold or gold alloy, and titanium or titanium alloy. In the case of the read-only optical information-recording medium, the recording layer is not formed. In this case, the reflective layer may be directly formed on the preformat pattern formation surface of the substrate.

The protective layer 4 is provided as a layer to protect the recording layer 2 and the reflective layer 3 from the mechanical shock and the chemical change. The protective layer 4 is formed by using an inorganic dielectric of the same type as or of the type different from that of the inorganic dielectric for constituting the enhance film, or an organic material such as ultraviolet-curable resin. Further, a substrate (dummy substrate), which has a flat surface and which is formed of plastic in the same manner as the substrate 1, may be stuck as the cover layer to be formed on the protective layer 4, onto the protective layer 4 by the aid of ultraviolet-curable resin or the like.

The depth of the in-groove pit and the film thickness of the recording layer of the optical information-recording medium of the present invention are determined as follows. Assuming that the wavelength of the recording and reproducing light beam is $\lambda$, the film thickness is adjusted so that the difference in optical path is $\lambda/6$ to $\lambda/3$ between the light beam which comes from the substrate, which passes through the land surface to arrive at the interface between the recording layer and the reflective layer, which is reflected by the interface, and which passes through the land surface again to be led toward the substrate and the light beam which comes from the substrate, which passes through the bottom surface of the in-groove pit to arrive at the interface between the recording layer and the reflective layer, which is reflected by the interface, and which passes through the bottom surface of the in-groove pit again to be led toward the substrate. Assuming that the wavelength of the recording and reproducing light beam is $\lambda$, the depth of the groove is adjusted so that the difference in optical path is $\lambda/16$ to $\lambda/8$ between the light beam which comes from the substrate, which passes through the land surface to arrive at the interface between the recording layer and the reflective layer, which is reflected by the interface, and which passes through the land surface again to be led toward the substrate and the light beam which comes from the substrate, which passes through the bottom surface of the groove to arrive at the interface between the recording layer and the reflective layer, which is reflected by the interface, and which passes through the bottom surface of the groove again to be led toward the substrate.

Figure 4:
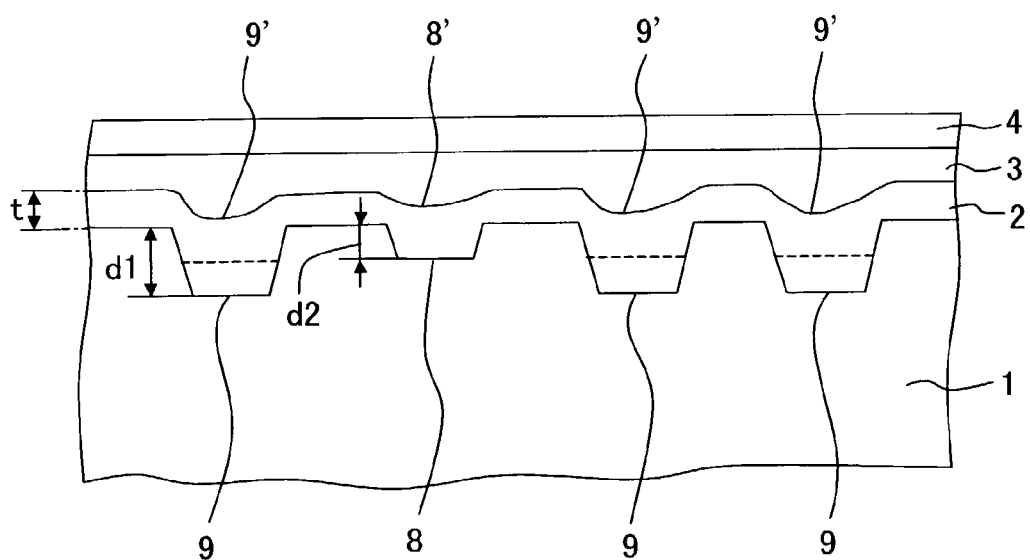
FIG. 4 shows a sectional view illustrating an optical information-recording medium according to another embodiment of the present invention.

As shown in FIG. 4, the interface between the recording layer 2 and the reflective layer 3 is not flat depending on the type and the film thickness of the recording layer 2. Recesses 8', 9' are formed depending on the surface shapes of the groove 8 and the in-groove pit 9. In this case, the depths of the recesses 8', 9' are previously determined by means of an experiment. The respective values of the depth d1 of the in-groove pit 9, the depth d2 of the groove 8, and the film thickness t of the recording layer 2 may be adjusted depending on the obtained values so that the conditions of the difference in optical path are satisfied as described above.

When the reflective layer 3 is directly formed on the preformat pattern formation surface of the substrate, for example, in the case of the read-only optical information-recording medium, then the depth of the in-groove pit may be formed to be $\lambda/6n$ to $\lambda/3n$, and the depth of the groove may be formed to be $\lambda/16n$ to $\lambda/8n$ provided that the wavelength of the recording and reproducing light beam is represented by $\lambda$ and the refractive index of the substrate is represented by n.

In the optical information-recording medium of the present invention, both of the cross-sectional shapes of the in-groove pit and the groove are formed to be the substantial trapezoids having the flat bottom surfaces. Therefore, it is possible to obtain a stable radial push-pull signal as compared with an optical information-recording medium having a groove in which the bottom surface is not flat. It is also possible to reduce the noise exerted on the reproduced signal to be detected from the in-groove pits. Accordingly, it is possible to realize a high recording density of the optical information-recording medium and a high S/N level of the reproduced signal.

As described above, the angle of inclination of the wall surface of the in-groove pit confronted in the track direction formed on the substrate of the optical information-recording medium is not less than 40 degrees and less than 90 degrees with respect to the bottom surface of the in-groove pit. The ratio between the shortest prepit length of the in-groove pit and the shortest space length is 0.8 to 1.2 at the half value portion of the depth of the in-groove pit. Further, the ratio between the height of the shortest space from the bottom surface of the in-groove pit and the height of the space other than the shortest space from the bottom surface of the in-groove pit is 0.95 to 1.0. Therefore, it is possible to obtain the reproduced signal of the in-groove pits at the high modulation factor and at the low jitter.

In another embodiment of the present invention, a media information-recording area for previously recording media information by using in-groove pits and a user recording area for recording information by a user are provided on a surface of a substrate of an optical information-recording medium on which a preformat pattern is formed. Accordingly, it is unnecessary to write the media information one by one into the recording layer of the optical information-recording medium by using an exclusive recording apparatus thereafter. It is possible to simplify the steps of producing the optical information-recording medium, and consequently it is possible to reduce the production cost of the optical information-recording medium.

The preformat pattern, which is formed in the media information-recording area, is composed of a substantially trapezoidal groove-shaped groove having a flat bottom surface and substantially trapezoidal groove-shaped in-groove pits having flat bottom surfaces arranged on the groove in the same manner as in the embodiment described above. The in-groove pit is prepared with any one of lengths of 3T to 11T and 14T provided that the clock cycle is represented by T. The media information is recorded in accordance with the arrangement of a plurality of in-groove pits having different lengths as described above.

Figure 19A:
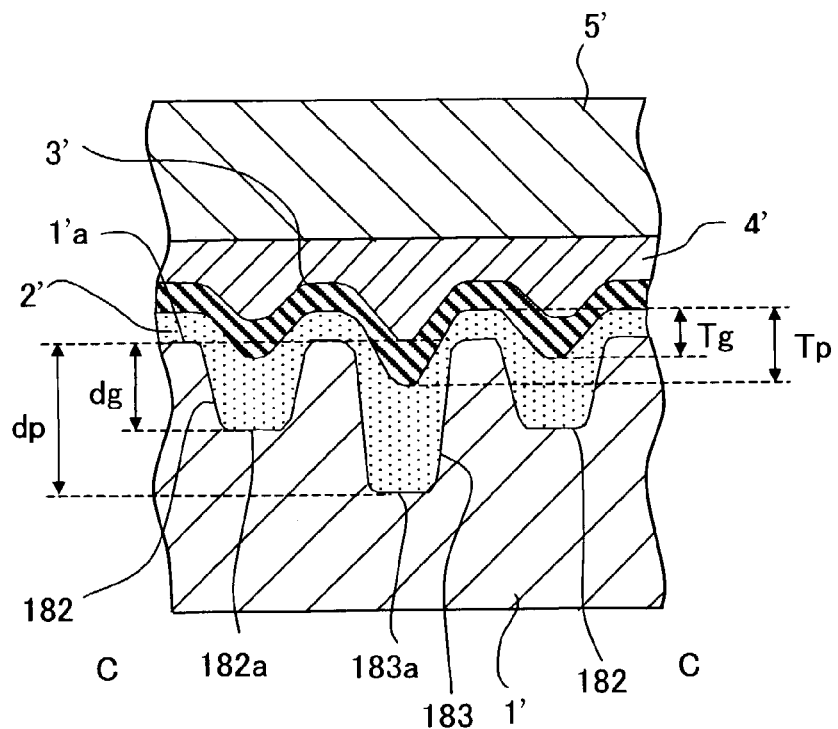
FIG. 19A shows a sectional view taken along a line C—C shown in FIG. 18.

As shown in FIG. 19A, the depth ranging from the land surface 1'a of the substrate 1' to the bottom surface 182a of the groove 182, i.e., the groove depth dg is formed to be slightly deeper than $\lambda/4n$ provided that the wavelength of the laser beam to be used for recording and reproducing information is represented by $\lambda$ and the refractive index of the substrate 1' is represented by n. Further, the depth ranging from the land surface 1'a of the substrate 1' to the bottom surface 183a of the in-groove pit 183, i.e., the in-groove pit depth dp is formed to be deeper than the groove depth dg. The ratio dp/dg between the groove depth dg and the in-groove pit depth dp is formed to be within a range of $1.4 \leq dp/dg \leq 1.7$ in order to produce the substrate 1' with ease.

Figure 20:
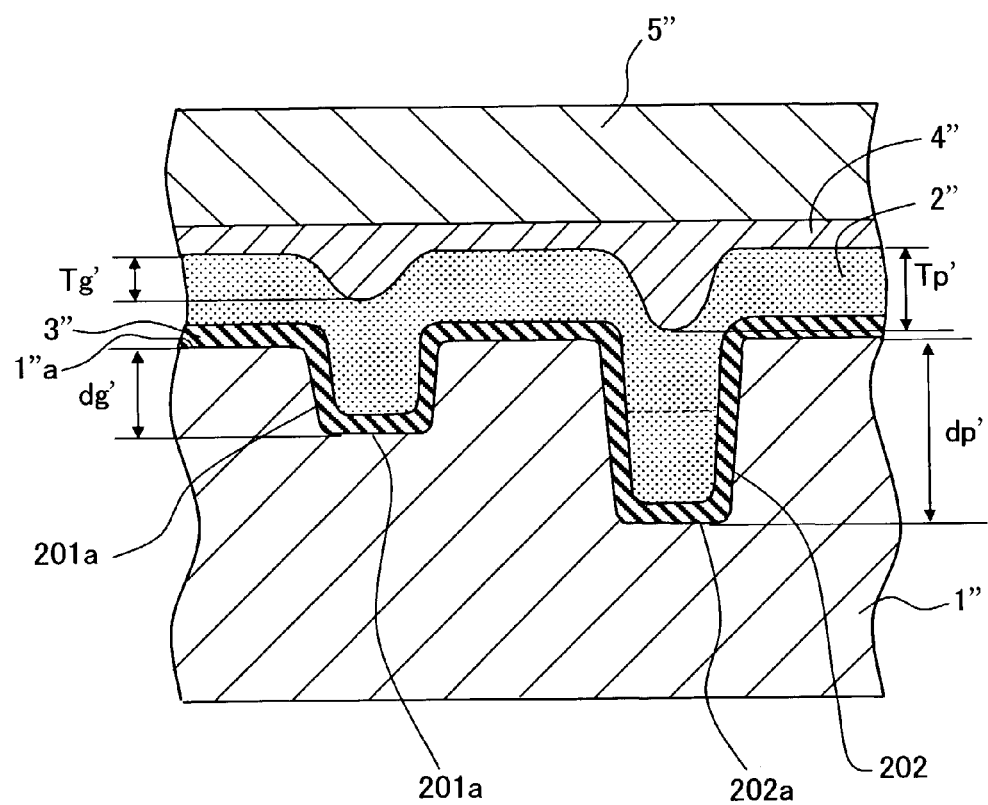
FIG. 20 shows a schematic sectional view illustrating an in-groove pit area of an optical information-recording medium according to a first modified embodiment of the present invention.
Figure 21A:
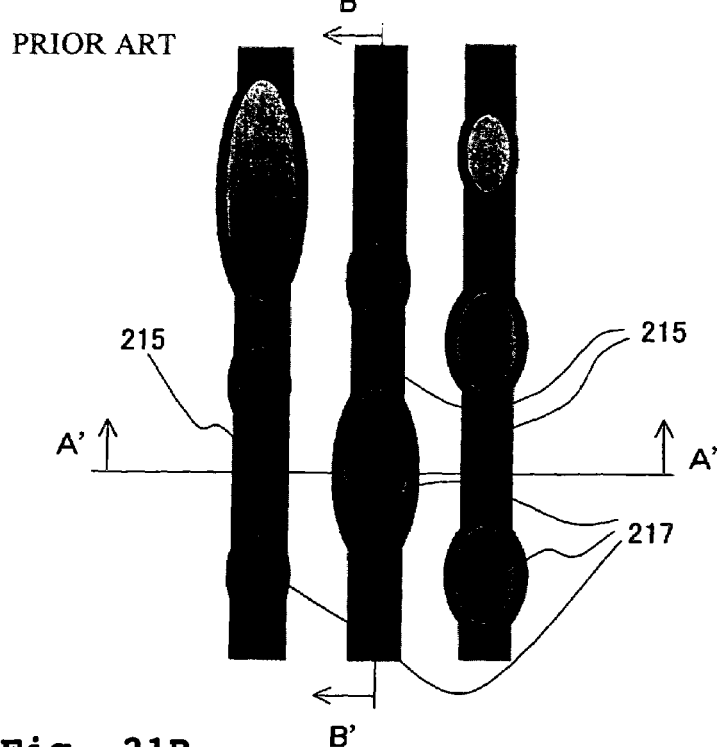
FIG. 21A shows a schematic top view illustrating an in-groove pit area of a conventional substrate for an optical information-recording medium having in-groove pits.
Figure 21B:
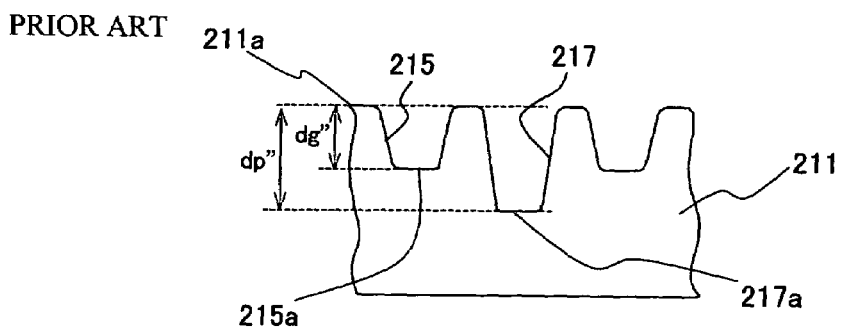
FIG. 21B shows a sectional view taken along a line A'—A' shown in FIG. 21A.
Figure 21C:
FIG. 21C shows a sectional view taken along a line B'—B' shown in FIG. 21A.
Figure 23:
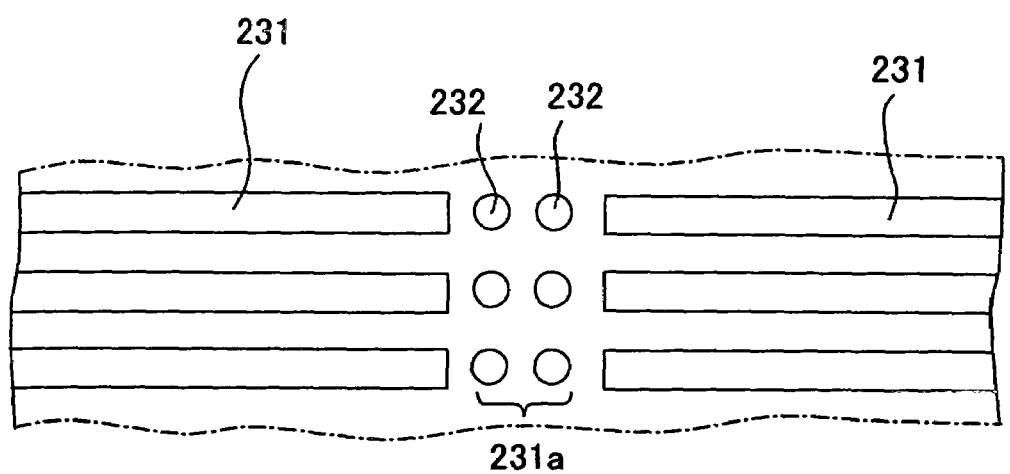
Figure 24:
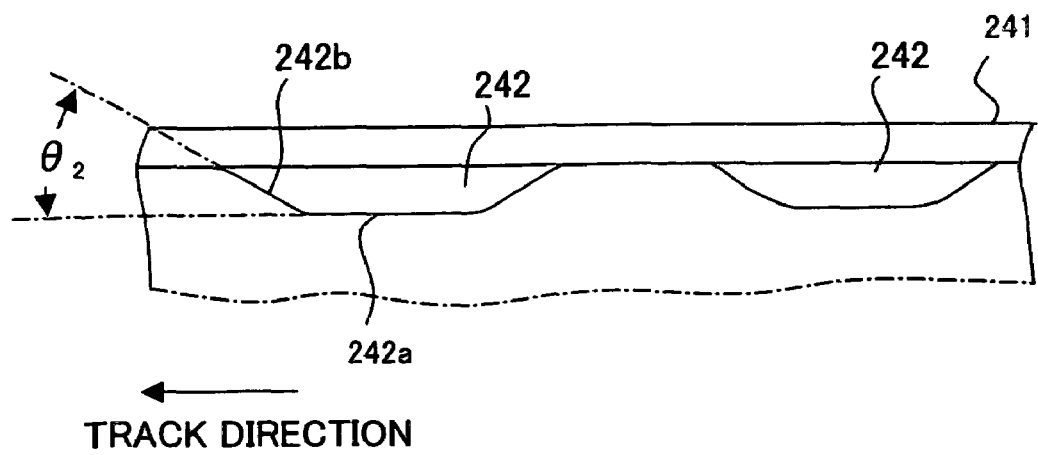
FIG. 24 shows a cross-sectional shape of conventional in-groove pits.

As shown in FIG. 20, in the case of the optical information-recording medium in which information is recorded and reproduced by radiating the laser beam from the side of the cover layer 5" not from the substrate 1", the depth ranging from the land surface 1"a of the substrate 1" to the bottom surface 201a of the groove 201, i.e., the groove depth dg' is formed to be slightly deeper than $\lambda/4n$ provided that the wavelength of the laser beam to be used for recording and reproducing information is represented by $\lambda$ and the refractive index of the dummy substrate 5" is represented by n. Further, the depth ranging from the land surface 11'a of the substrate 1" to the bottom surface 202a of the in-groove pit 202, i.e., the in-groove pit depth dp' is formed to be deeper than the groove depth dg'. The ratio dp'/dg' between the groove depth dg' and the in-groove pit depth dp' is formed to be within a range of $1.4 \leq dp'/dg' \leq 1.7$ in order to produce the substrate 1" with ease.

In the optical information-recording medium according to the embodiment of the present invention, the preformat pattern for constituting the user-recording area may be composed of a substantially trapezoidal groove-shaped groove having a flat bottom surface and substantially trapezoidal groove-shaped in-groove pits having flat bottom surfaces arranged on the groove, in the same manner as the preformat pattern for constituting the media information-recording area. Alternatively, wobble pits for controlling the tracking may be provided without providing the groove.

The recording layer 2' shown in FIG. 19A is formed by spin-applying the organic dye dissolved in an organic solvent onto the preformat pattern formation surface of the substrate 1'. The surface of the recording layer 2' is not smooth, because it receives the external force such as the centrifugal force during the spin application. The surface of the recording layer 2' is formed to be concave/convex depending on the groove depth dg and the in-groove pit depth dp. The recording layer 2' is formed so that the recess depth of the recording layer (maximum recess depth of the recording layer) Tp ranging from the interface between the recording layer 2' and the reflective layer 3' on the land surface 1'a of the substrate 1' to the interface between the recording layer 2' and the reflective layer 3' at the in-groove pit 183 is larger than the recess depth of the recording layer (maximum recess depth of the recording layer) Tg ranging from the interface between the recording layer 2' and the reflective layer 3' on the land surface 1'a of the substrate 1' to the interface between the recording layer 2' and the reflective layer 3' at the groove 182. The recording layer 2' is formed so that the ratio Tp/Tg between the maximum recess depth of the recording layer Tg and the maximum recess depth of the recording layer Tp is larger than the ratio dp/dg between the groove depth dg and the in-groove pit depth dp. Accordingly, even when the formation is not effected such that the ratio dp/dg has a value at which the good signal modulation factor and the good radial push-pull signal are obtained, it is possible to increase the difference in optical path length ($\approx 2\times(Tp-Tg)$) between the optical path length of the laser beam at the groove and the optical path length of the laser beam at the in-groove pit. The formation is effected so that Tp/Tg is within a range of $1.6 \leq Tp/Tg \leq 2.0$ in order to reproduce the media information at the high signal modulation factor and at the low jitter. The maximum recess depth of the recording layer Tp is adjusted to be an identical level for all of the in-groove pits having different lengths. Further, the formation is effected so that the value of Tp/Tg is within the range described above. Known organic dye materials including, for example, azo dyes and cyanine dyes, which are applicable to the write-once type optical information-recording medium, can be used as the organic dye material.

First Embodiment

An explanation will be made below with reference to FIGS. 5 to 16 about a method for producing an optical information-recording medium according to a first embodiment of the present invention.

The optical information-recording medium is manufactured by executing a master disk-cutting step of forming a desired pattern on a surface of a master disk, a stamper-manufacturing step of manufacturing a stamper on the basis of the master disk having been subjected to the cutting, a substrate-manufacturing step of replicating a substrate of the optical information-recording medium with the manufactured stamper, and a film-forming step of forming a variety of films on the replicated substrate.

Method for Manufacturing Master Disk and Stamper to Manufacture Substrate

Figure 5A:
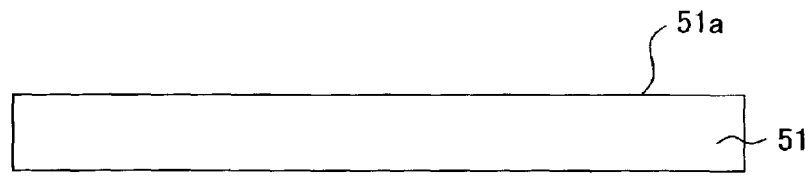
FIGS. 5A to 5C explain a method for manufacturing a master disk to be used for producing an optical information-recording medium according to a first embodiment of the present invention.
Figure 5B:
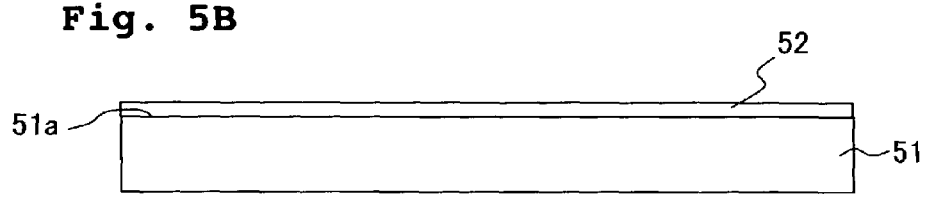
Figure 5C:
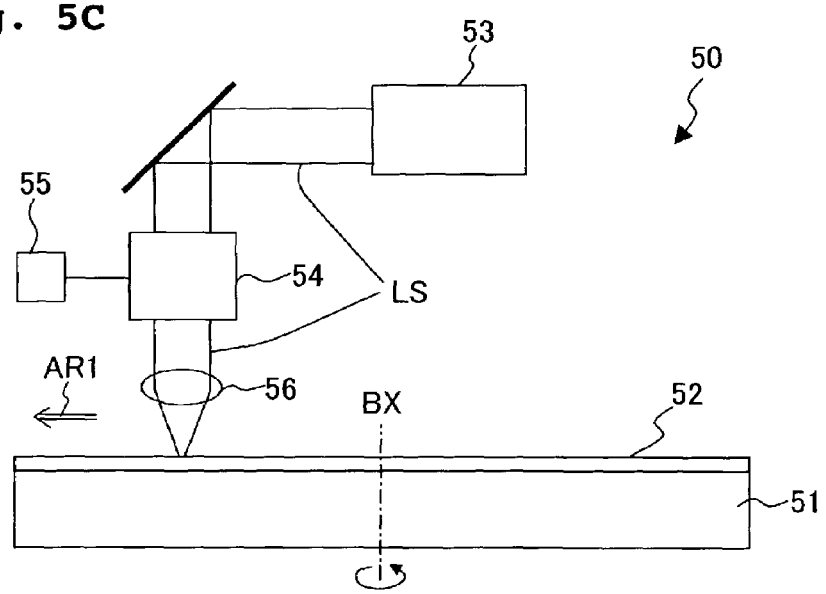

At first, an explanation will be made with reference to FIGS. 5 to 9 about a method for manufacturing a master disk and a stamper in order to manufacture a substrate 1 of the optical information-recording medium according to the present invention. As shown in FIG. 5A, a glass master disk 51 having a diameter of 200 mm and a thickness of 6 mm was prepared. Subsequently, as shown in FIG. 5B, a photoresist 52 was applied onto one surface 51*a* of the glass master disk 51 uniformly to have a thickness of 200 nm by using the spin coat method. Subsequently, the glass master disk 51, on which the photoresist 52 was formed, was installed to a master disk-cutting apparatus (master disk exposure apparatus) 50 shown in FIG. 5C. The master disk-cutting apparatus 50 principally comprises, for example, a Kr gas laser oscillator 53 for oscillating a laser beam having a wavelength of 351 nm, an optical modulator 54 composed of an acoustic optical modulator element, a signal source 55 for feeding a modulation signal to the optical modulator 54, a light-collecting lens 56, and a drive unit (not shown) for rotating the glass master disk. As shown in FIG. 5C, the laser beam LS, which is radiated from the laser oscillator 53 of the master disk-cutting apparatus 50, passes through the optical modulator 54 and the light-collecting lens 56, and it is radiated onto the photoresist 52 on the glass master disk 51. In this procedure, the glass master disk 51 was rotated at a predetermined number of revolutions about the center of the central axis BX of the glass master disk 51. The laser beam LS was moved (see the arrow AR1) so that the position of radiation of the laser beam LS on the glass master disk 51 was moved from the inside to the outside of the glass master disk 51 in the radial direction of the glass master disk 51.

Figure 6A:
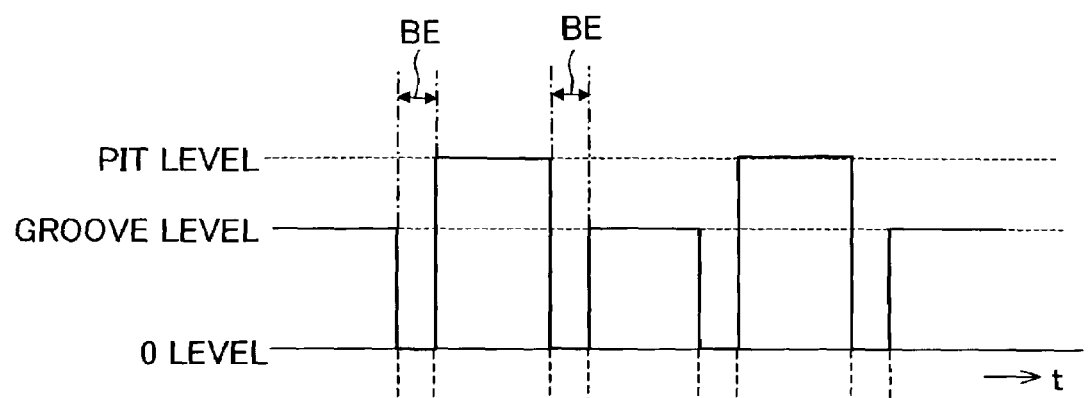
FIG. 6A shows a time-dependent change of the exposure intensity of a laser beam to be used for exposing the master disk of the first embodiment.

The optical modulator 54 is used to change the exposure intensity of the laser beam LS to be radiated onto the glass master disk 51 while moving the laser beam LS as described above. In this embodiment, the exposure intensity of the laser beam was changed to two ranks, i.e., to the low level and the high level as shown in FIG. 6A. The exposure intensity, which was used when the groove formation portion having no in-groove pit formation portion was formed, was set to the low level (hereinafter referred to as "groove level"). Further, the exposure intensity, which was used when the groove formation portion having the in-groove pit formation portion was formed, was set to the high level (hereinafter referred to as "pit level") for the in-groove pit formation portion and to the groove level for the other groove formation portions. The groove level was set so that 55% of the exposure intensity was obtained when the pit level was 100%. Accordingly, the photoresist, which is disposed at the in-groove pit formation portion, is subjected to the exposure to arrive at the interface between the photoresist and the master disk. On the other hand, the photoresist, which is disposed at the groove formation portion, is not subjected to the exposure to arrive at the interface between the photoresist and the master disk. Each of the in-groove pit formation portions is formed to have any one of channel bit lengths of 3T to 11T and 14T provided that the clock cycle is represented by T. The clock cycle T is appropriately adjustable depending on the reproducing apparatus to be used.

Figure 6B:
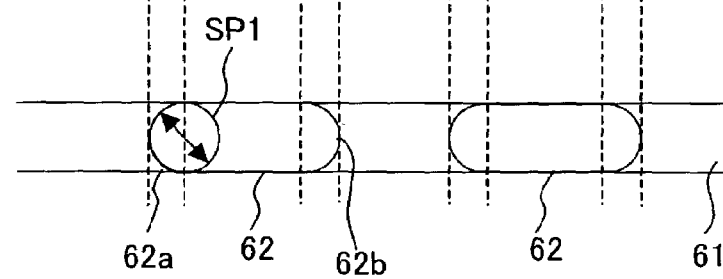
FIG. 6B shows a dimensional relationship of an in-groove pit formation portion and a groove formation portion corresponding thereto.

Further, in this embodiment, in relation to the exposure intensity for the in-groove pit formation portion as shown in FIG. 6A, the period of time (blank period) BE, in which the exposure intensity of the laser beam was allowed to be temporarily at a level lower than the groove level, was provided every time when the exposure intensity is switched from the groove level to the pit level or from the pit level to the groove level. In this embodiment, the exposure intensity of the laser beam was at the zero level in the blank period BE. As shown in FIG. 6B, when the blank period is provided, the exposure amount for the photoresist at each of the front end 62*a* and the rear end 62*b* of the in-groove pit formation portion 62 is an exposure amount corresponding to the radius of the laser spot SP1. Accordingly, the redundancy of the in-groove pit, which amounts to the diameter of the laser spot SP1, can be avoided. Further, the photoresist, which is disposed at the in-groove pit formation portion, is subjected to the exposure with the sufficient exposure intensity as described above. Therefore, it is possible to dissolve the insufficiency of the exposure for the photoresist at the front end and the rear end of the in-groove pit formation portion. Thus, it is possible to form the in-groove pit formation portion having a high processing accuracy in which the angle of inclination of the wall surface is not less than 40 degrees and less than 90 degrees at the front end and the rear end of the in-groove pit formation portion.

The blank period BE is set on the basis of the three parameters of the modulation factor, the jitter, and the radial push-pull of the in-groove pit reproduced signal detected from the optical information-recording medium. The blank period BE can be changed depending on the channel bit length of the in-groove pit to be formed. In this embodiment, the blank period BE was 0.2T on the basis of the values of the three parameters during the exposure for the in-groove pit formation portion having the shortest channel bit length 3T. The method for setting the blank period will be explained later on.

Figure 7A:
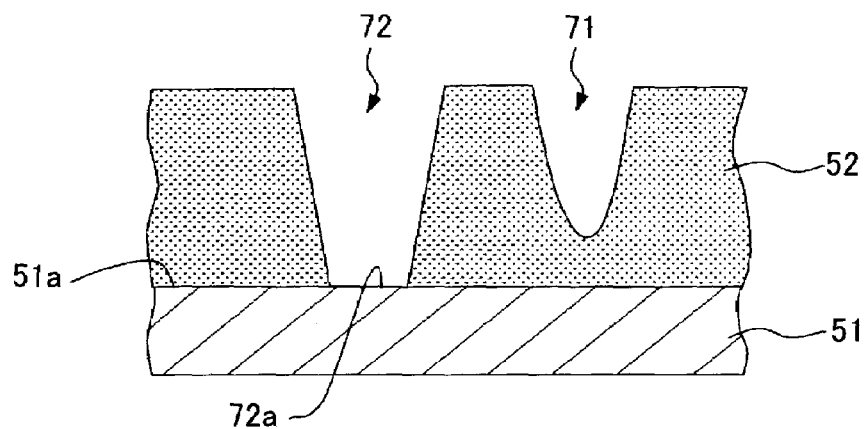
FIGS. 7A to 7C explain the method for manufacturing the master disk according to the first embodiment.

Subsequently, the glass master disk, on which the photoresist was photosensitized, was taken out from the cutting apparatus to perform a development treatment. Accordingly, as shown in FIG. 7A, the groove formation portion 71 and the in-groove pit formation portion 72 were formed on the glass master disk 51. The groove formation portion 71 is formed so that the cross section is V groove-shaped. The photoresist 52 is removed from the surface of the glass master disk 51 by means of the development treatment at the in-groove pit formation portion 72 at which the surface 51a of the glass master disk 51 appears as an exposed section 72a.

Figure 7B:
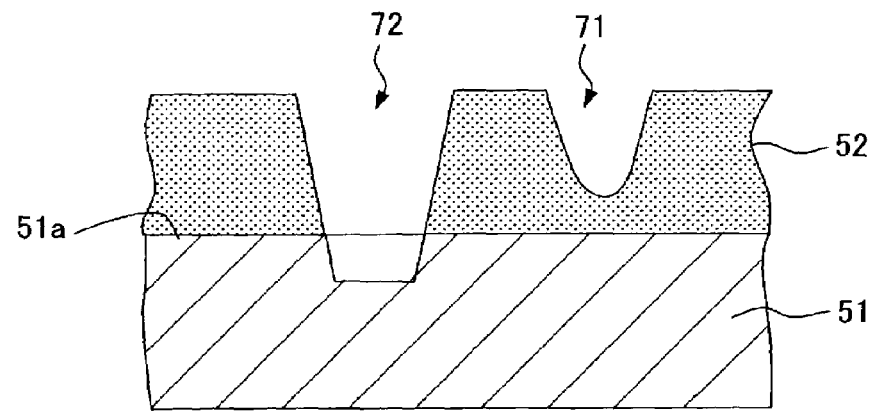
Figure 7C:
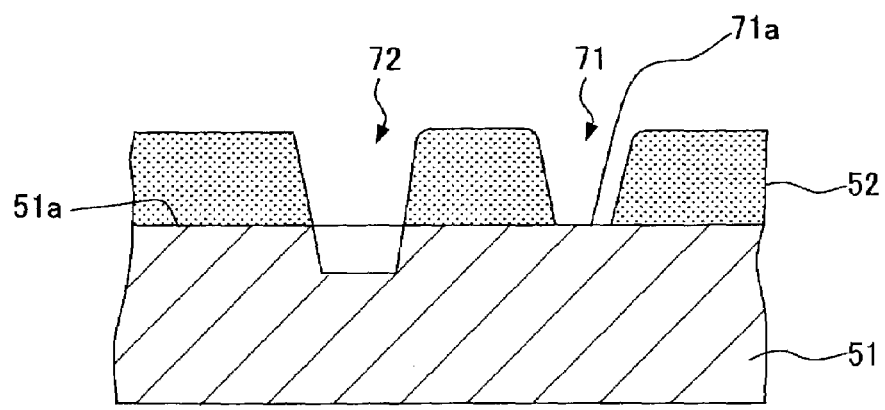
Figure 8A:
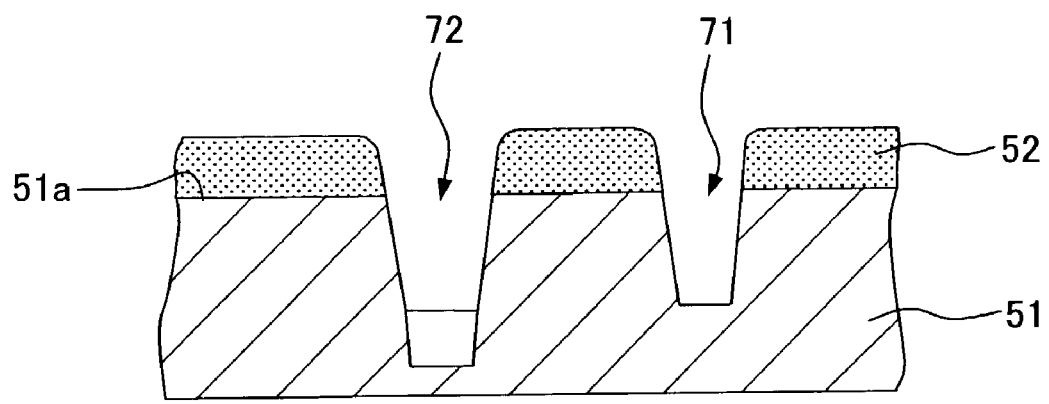
FIGS. 8A and 8B explain the method for manufacturing the master disk according to the first embodiment.
Figure 8B:
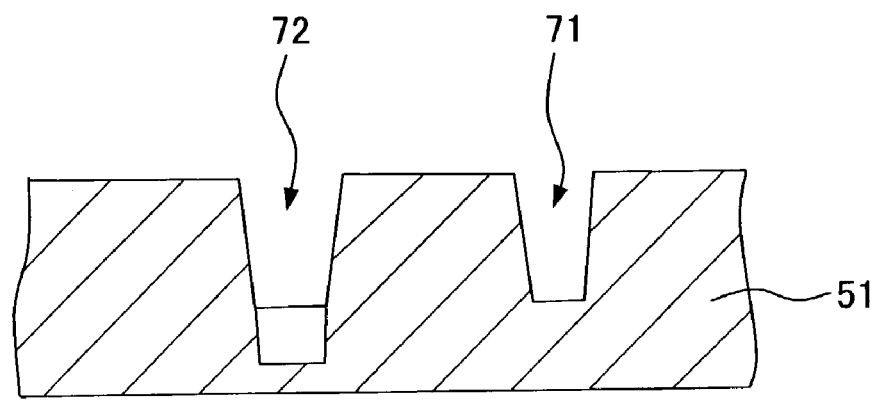

Subsequently, as shown in FIG. 7B, the surface of the photoresist 52 formed on the glass master disk 51 was etched in a gas atmosphere of $C_2F_6$ by using an unillustrated RIE (reactive ion etching) apparatus. A gas of $CF_4$, $C_3F_6$ or the like may be used in place of the gas of $C_2F_6$. Accordingly, the in-groove pit formation portions 72 are etched to arrive at a depth of 90 nm from the surface 51a of the glass master disk 51 respectively. Subsequently, as shown in FIG. 7C, in order to expose the surface 51a of the glass master disk 51 at the groove formation portion 71, an unillustrated resist-ashing apparatus based on $O_2$ was used to curtail the photoresist 52 by a predetermined thickness. Accordingly, the glass master disk surface 71a was exposed at the groove formation portions 71. Further, as shown in FIG. 8A, RIE was performed again in the gas atmosphere of $C_2F_6$ for the formation surface of the photoresist 52 on the glass master disk 51. Accordingly, the groove formation portion 71 was etched to arrive at a depth of 170 nm from the glass master disk surface 51a. Simultaneously, the in-groove pit formation portion 72 was etched to arrive at a depth of 260 nm from the glass master disk surface 51a. Subsequently, as shown in FIG. 8B, the resist-ashing apparatus (not shown) was used again to remove the photoresist 52 from the surface of the glass master disk 51. Accordingly, the glass master disk 51 was obtained, in which the desired concave/convex pattern was formed on the surface.

The angle of inclination of the wall surface confronted in the track direction of the in-groove pit formation portion of the glass master disk obtained as described above, the shortest prepit length and the shortest space length at the half value portion of the depth of the in-groove pit, and the ratio between the height of the shortest space from the bottom surface of the in-groove pit and the height of the space other than the shortest space from the bottom surface of the in-groove pit were determined by using an atomic force microscope.

The angle of inclination of the wall surface confronted in the track direction of the in-groove pit formation portion was 60 degrees in the case of the in-groove pit having the prepit length of 3T. The angles of inclination of the wall surfaces at the front ends and the rear ends in the track direction at the in-groove pit formation portions having the prepit lengths other than the above were formed to be not less than 40 degrees and less than 90 degrees in any case.

The shortest prepit length at the half value portion of the depth of the in-groove pit was formed to be 400 nm to 420 nm. The shortest space length was formed to be 355 nm to 375 nm.

The height of the shortest space from the bottom surface of the in-groove pit (the distance of the shortest space from the bottom surface of the in-groove pit to the bottom surface of the groove) was formed to be 90 nm to 85 nm. (The distance of the shortest space from the bottom surface of the in-groove pit to the land surface was formed to be 262 nm to 258 nm.) The height of the space other than the shortest space from the bottom surface of the in-groove pit was formed to be 90 nm to 85 nm. Therefore, the ratio between the height of the shortest space from the bottom surface of the in-groove pit and the height of the space other than the shortest space from the bottom surface of the in-groove pit is 0.95 to 1.0. Accordingly, it is appreciated that the formation is effected such that the heights of the spaces from the bottom surface of the in-groove pit have approximately identical height positions in any case.

Figure 9:
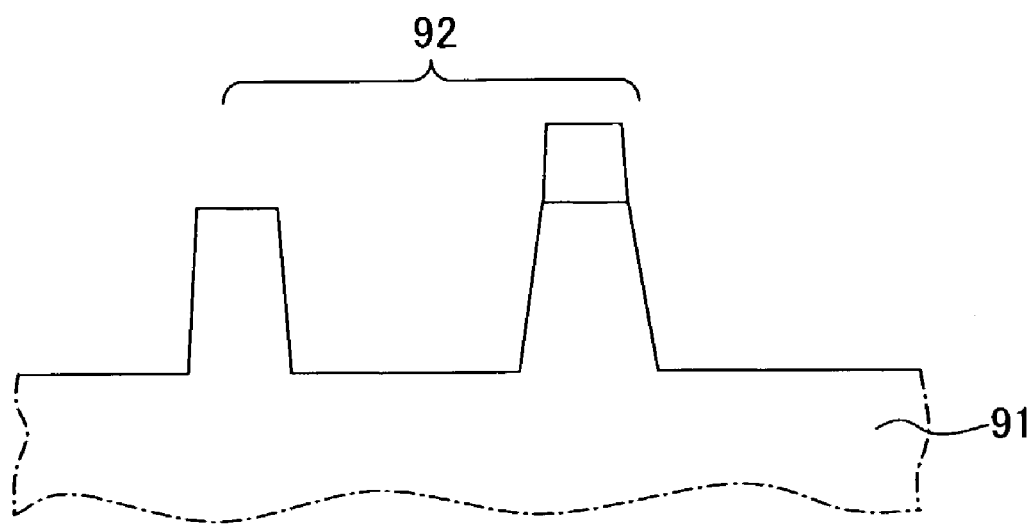
FIG. 9 shows a schematic sectional view illustrating a stamper manufactured in the first embodiment.

Subsequently, the electroless plating was applied as a pretreatment for the plating onto the pattern formation surface of the glass master disk. Further, an Ni layer having a thickness of 0.3 mm was formed by means of the electroforming method by using the plating layer as a conductive film. Subsequently, the surface of the Ni layer formed on the glass master disk was polished. The Ni layer was exfoliated from the glass master disk, and thus a stamper 91 as shown in FIG. 9 was obtained. A negative pattern 92 of the concave/convex pattern formed on the surface of the master disk is formed on the surface of the stamper 91. The conductive film, which was formed in the pretreatment for the plating, may be formed by using the sputtering method or the vapor deposition method. The stamper may be manufactured by adding additional steps, for example, such that a lining material is bonded to the stamper.

Method for Manufacturing Optical Information-recording Medium

Figure 10:
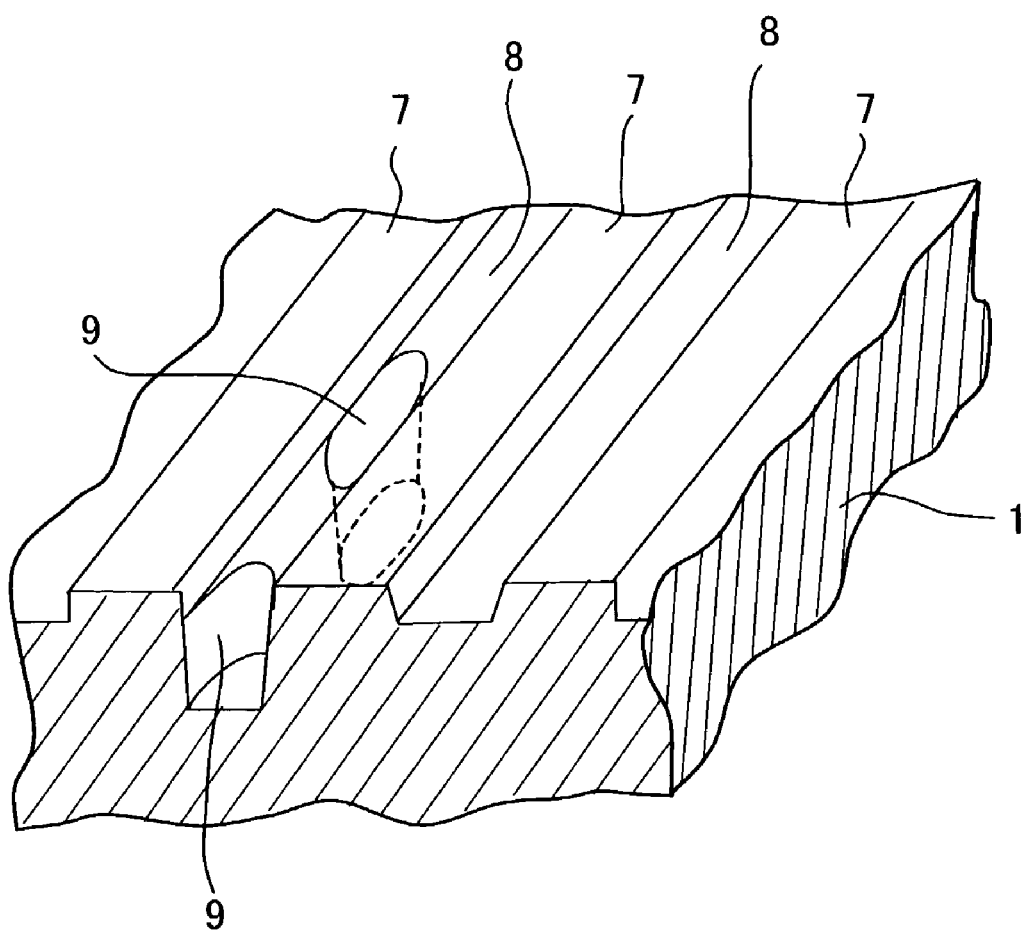
FIG. 10 shows a schematic perspective view illustrating a pattern formation surface of a substrate obtained in the first embodiment.

Next, a method for manufacturing the optical information-recording medium will be explained with reference to FIGS. 10 and 11. The stamper was installed to an existing injection molding machine to obtain a substrate 1 by means of the injection molding. The substrate 1 is a substrate made of polycarbonate having a diameter of 120 mm and a thickness of 0.6 mm. As shown in FIG. 10, the pattern, which has the same shape as the shape of the concave/convex pattern including, for example, the groove formation portions and the in-groove pit formation portions formed on the glass master disk, is transferred onto one surface of the substrate 1 (land 7, groove 8, and in-groove pit 9). The bottom surface of the in-groove pit formed on the substrate was observed by using a transmission electron microscope (TEM). It was revealed that a flat area, which was defined by widths of at least 50 nm in the radial direction and the track direction of the substrate respectively, was present on the bottom surface of the in-groove pit. Similarly, the bottom surface of the groove formed on the substrate was observed by using a transmission electron microscope (TEM). It was revealed that a flat area, which was defined by widths of at least 50 nm in the radial direction and the track direction of the substrate respectively, was also present on the bottom surface of the groove.

A solution, which had a concentration of 1% by weight of an azo dye represented by the following chemical formula (1), was applied by using the spin coat method onto the pattern formation surface of the substrate 1 so that the thickness was 30 nm between the grooves, i.e., on the land portion. In this procedure, the amount of application of the solution was 1 g. The substrate was rotated at a number of revolutions of 100 rpm for 30 seconds from the start of the application, and the substrate was rotated at a number of revolutions of 800 to 1000 rpm for 30 seconds thereafter. When the dye solution was applied, tetrafluoropropanol was used as a solvent to prepare the azo dye solution. Impurities were removed by means of the filtration through a filter. The dye solution was spin-applied to an outer circumferential portion disposed outside a radius of 21.0 mm on the basis of the center of rotation of the substrate 1. Subsequently, the substrate 1, to which the dye material was applied, was dried at 70° C. for 1 hour, followed by being cooled at room temperature for 1 hour. Thus, a recording layer 2 was formed on the substrate 1 (see FIG. 11). The surface of the recording layer 2 is not smooth, because it receives the external force such as the centrifugal force during the spin application. The surface of the recording layer 2 is formed to be concave/convex depending on the groove depth and the in-groove pit depth.

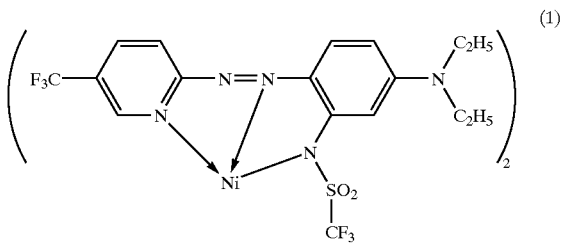

(1)

Figure 11:
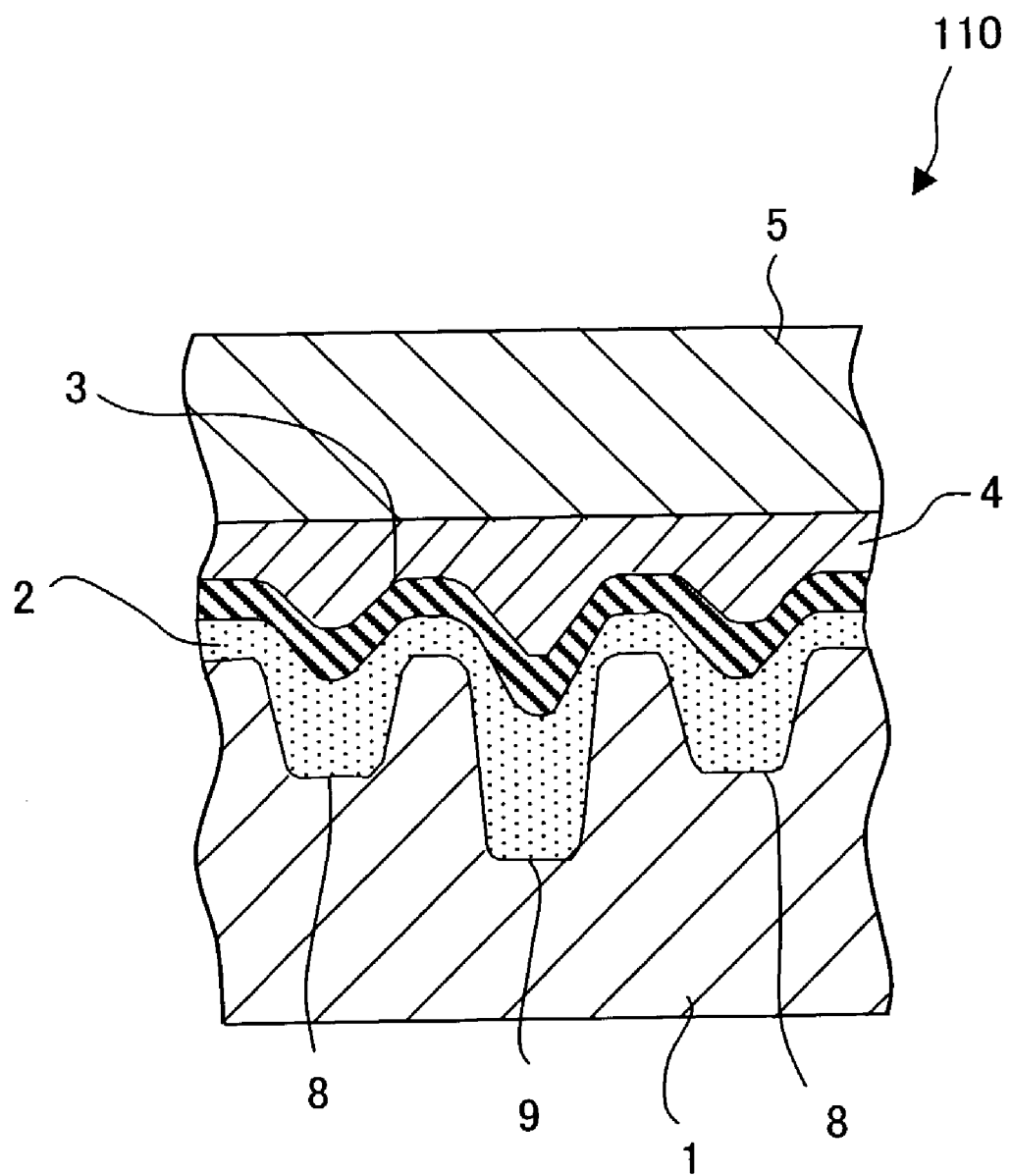
FIG. 11 shows a schematic sectional view illustrating an in-groove pit area of the optical information-recording medium obtained in the first embodiment.

Further, as shown in FIG. 11, an Ag alloy was formed as a reflective layer 3 to have a thickness of 100 nm on the recording layer 2 by using the sputtering method. Subsequently, an ultraviolet-curable resin 4 was applied to have a thickness of 10 μm on the reflective layer 3 by means of the spin coat method. Further, a substrate made of polycarbonate (dummy substrate) 5 having a thickness of 0.6 mm similarly to the substrate 1 was placed thereon while adjusting the center. The substrate 1, on which the respective layers were formed, was irradiated with ultraviolet light in this state to cure the ultraviolet-curable resin 4. Accordingly, the substrate 1, on which the respective layers were formed, was stuck to the dummy substrate 5. Thus, the optical information-recording medium 110 was obtained.

Method for Setting Blank Period

Figure 12A:
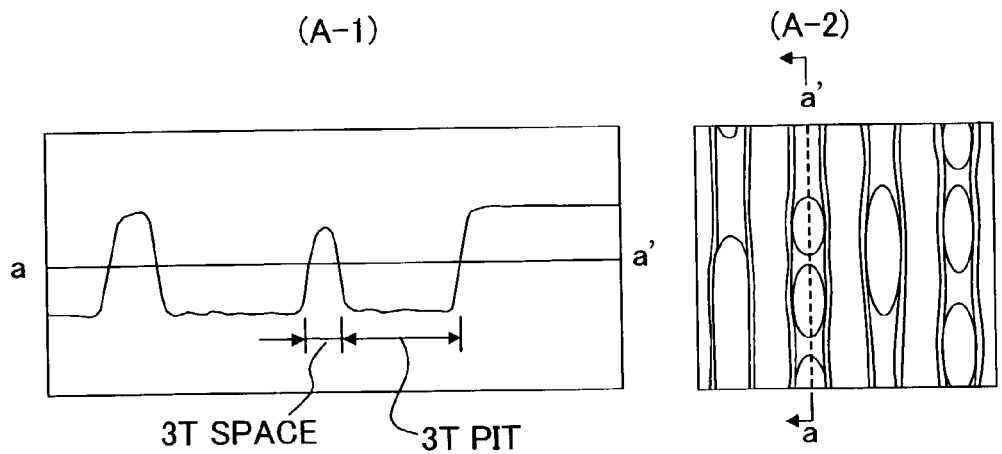
Figure 12B:
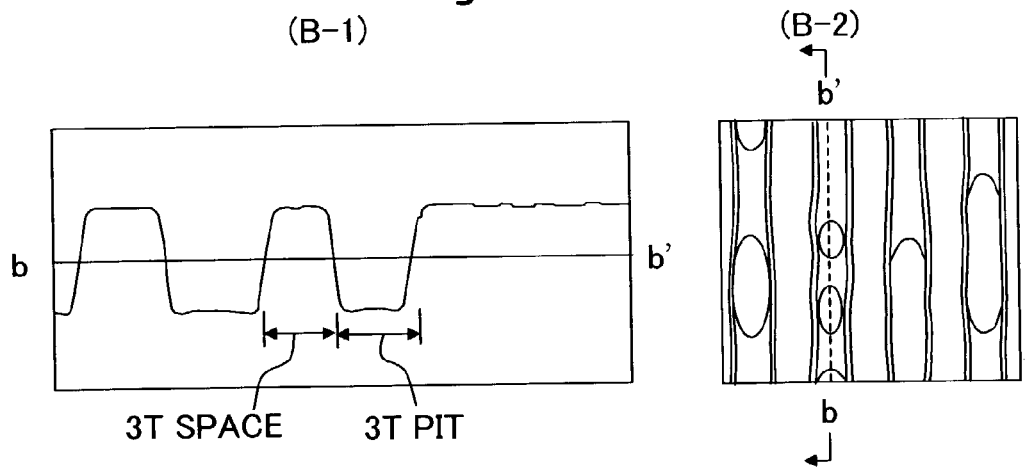
Figure 12C:
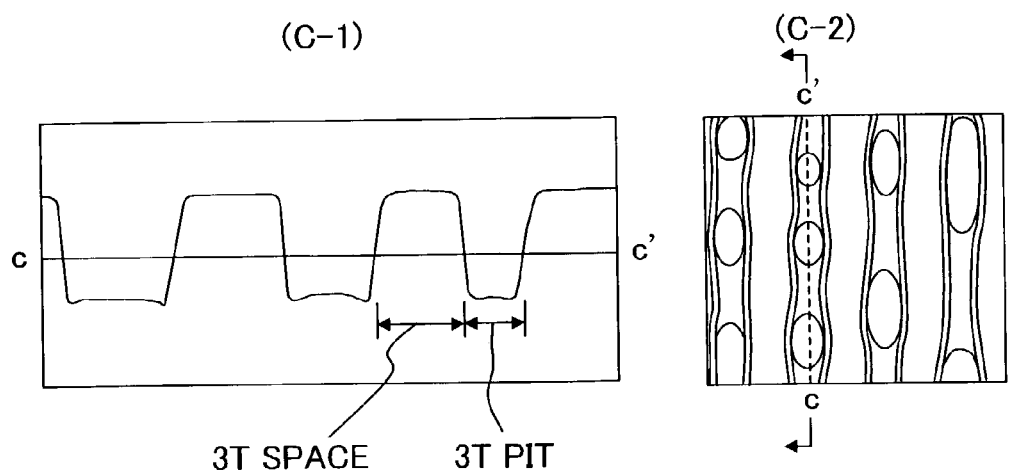

A method for setting the blank period will be explained below with reference to FIGS. 12 to 16. FIGS. 12A to 12C show cross-sectional shapes in the track direction and planar shapes of 3T signal-recorded portions (prepit length: 3T, space length: 3T) of respective substrates manufactured by using three types of master disks subjected to the cutting while changing the blank period. All of the cross-sectional shapes and the planar shapes were observed by using an atomic force microscope. FIG. 12A shows the cross-sectional shape in the track direction (reference symbol: A-1) and the planar shape (reference symbol A-2) of the substrate obtained when the blank period was not provided (blank period: 0). FIG. 12B shows the cross-sectional shape in the track direction (reference symbol: B-1) and the planar shape (reference symbol B-2) of the substrate obtained when the blank period was 0.2T. FIG. 12C shows the cross-sectional shape in the track direction (reference symbol: C-1) and the planar shape (reference symbol C-2) of the substrate obtained when the blank period was 0.3T. According to the drawings, the following fact is appreciated in relation to the relationship between the blank period and the prepit size.

For example, as shown in FIG. 12A, when the blank period is not provided, or when the blank period is excessively short, then the prepit size is increased, and the space size is decreased corresponding thereto. On the other hand, for example, as shown in FIG. 12C, when the blank period is excessively increased, then the prepit size is decreased, and the space size is increased corresponding thereto. In this embodiment, as shown in FIG. 12B, when the blank period was 0.2T, then the size of the 3T prepit and the size of the 3T space were approximately equivalent to one another, and the desired prepit size and the desired space size were successfully obtained.

Figure 13A:
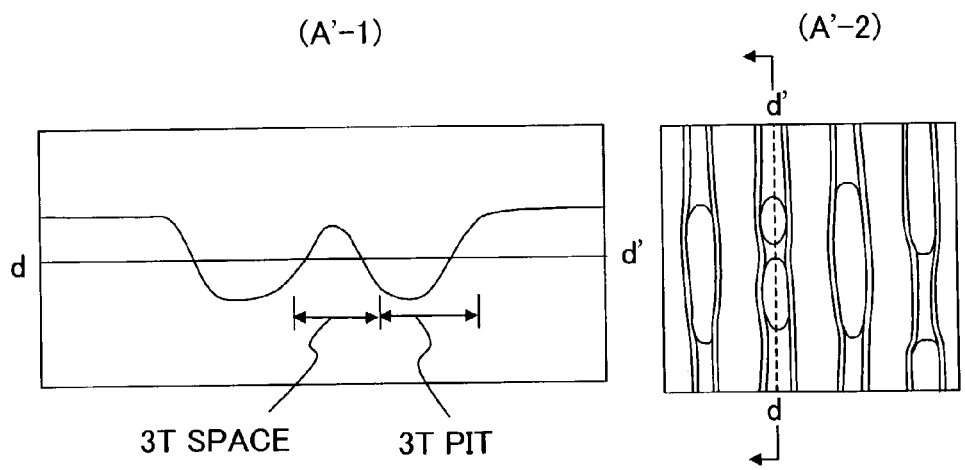
Figure 13B:
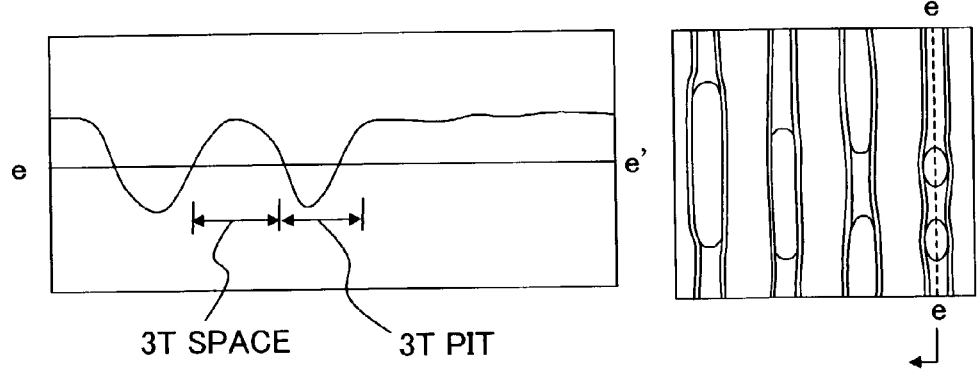
Figure 13C:
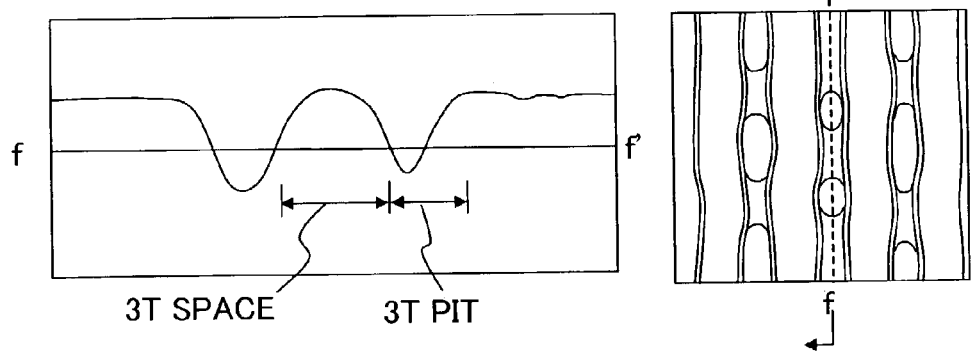
Figure 14:
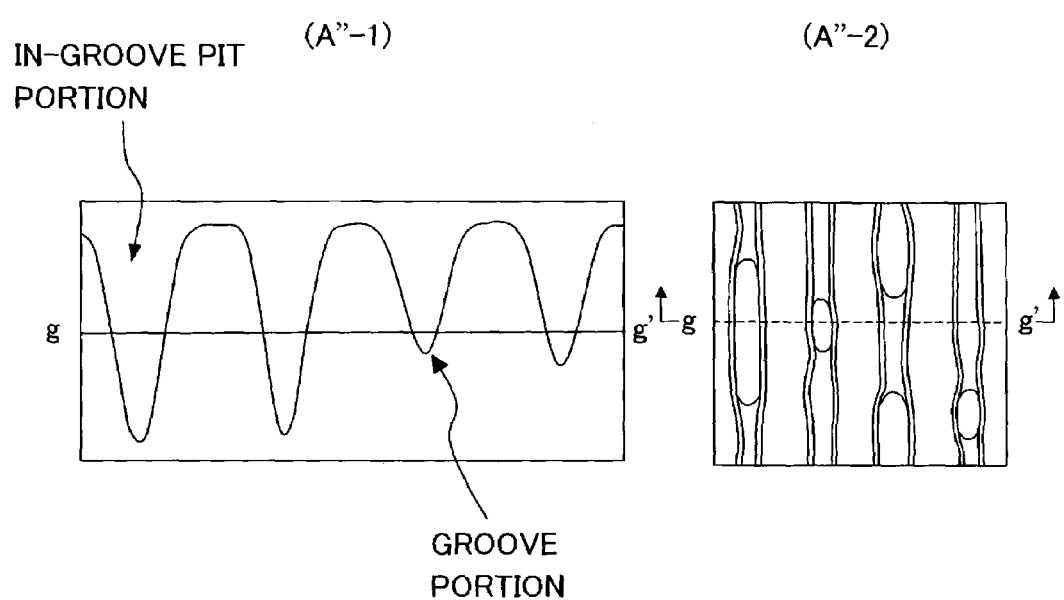
FIG. 14 shows a cross-sectional shape and a planar shape of the optical information-recording medium in a direction perpendicular to the track direction obtained when the blank period is 0.2T.

Next, FIGS. 13A to 13C show cross-sectional shapes in the track direction and planar shapes of optical information-recording media obtained by applying the dye recording film to have a film thickness of 200 nm onto preformat pattern formation surfaces of the three types of the substrates described above. FIG. 13A shows the cross-sectional shape in the track direction (reference symbol: A'-1) and the planar shape (reference symbol A'-2) of the optical information-recording medium obtained when the blank period was not provided (blank period: 0). FIG. 13B shows the cross-sectional shape in the track direction (reference symbol: B'-1) and the planar shape (reference symbol B'-2) of the optical information-recording medium obtained when the blank period was 0.2T. FIG. 13C shows the cross-sectional shape in the track direction (reference symbol: C'-1) and the planar shape (reference symbol C'-2) of the optical information-recording medium obtained when the blank period was 0.3T. FIG. 14 shows a cross-sectional shape in a direction perpendicular to the track direction (reference symbol: A"-1) and a planar shape (reference symbol A"-2) of the optical information-recording medium obtained when the blank period was 0.2T. The cross-sectional shapes and the planar shapes were observed by using an atomic force microscope in the same manner as described above. As shown in FIGS. 13A to 13C, recesses are formed on the surface of the recording film corresponding to the shapes of the in-groove pits formed on the substrate. For example, as shown in FIG. 13A, when the blank period is not provided, or when the blank period is excessively short, then the prepit size is increased, and the space size is decreased corresponding to the increased length of the prepit. On the other hand, as shown in FIG. 13C, when the blank period is excessively increased, then the prepit size is decreased, and the space size is increased corresponding to the shortened length of the prepit. In this embodiment, as shown in FIG. 13B, when the blank period is 0.2T, the size of the 3T prepit and the size of the 3T space are approximately equivalent to one another. In this case, as shown in FIG. 14, recesses are formed on the surface of the recording film corresponding to the depths of the in-groove pits and the groove formed on the substrate respectively. Owing to the difference in recess depth, it is possible to optically distinguish the in-groove pit from the groove.

Figure 15A:
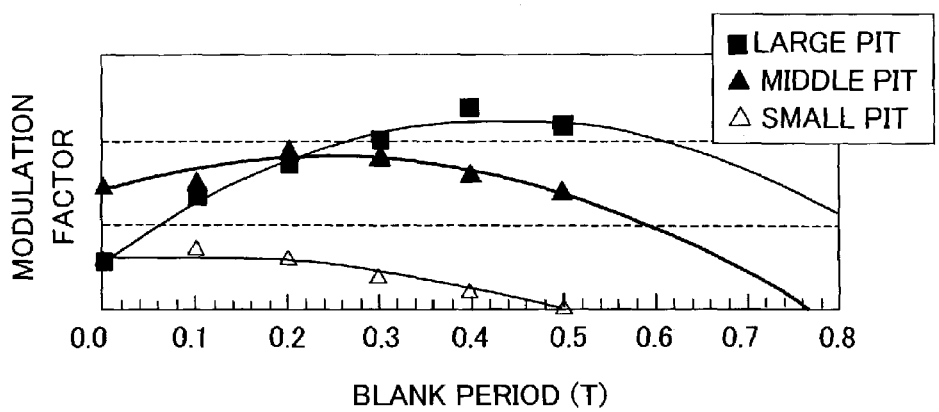
FIGS. 15A to 15C show the modulation factor at the 3T signal-recorded portion, the change of jitter, and the change of radial push-pull obtained when the blank period is variously changed.
Figure 15B:
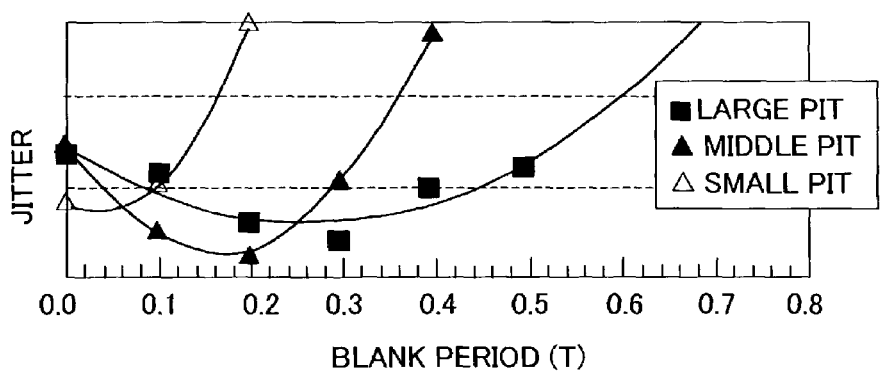
Figure 15C:
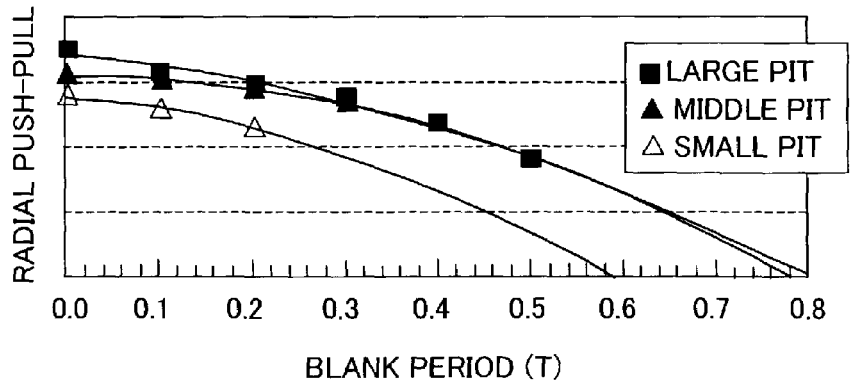
Figure 16A:
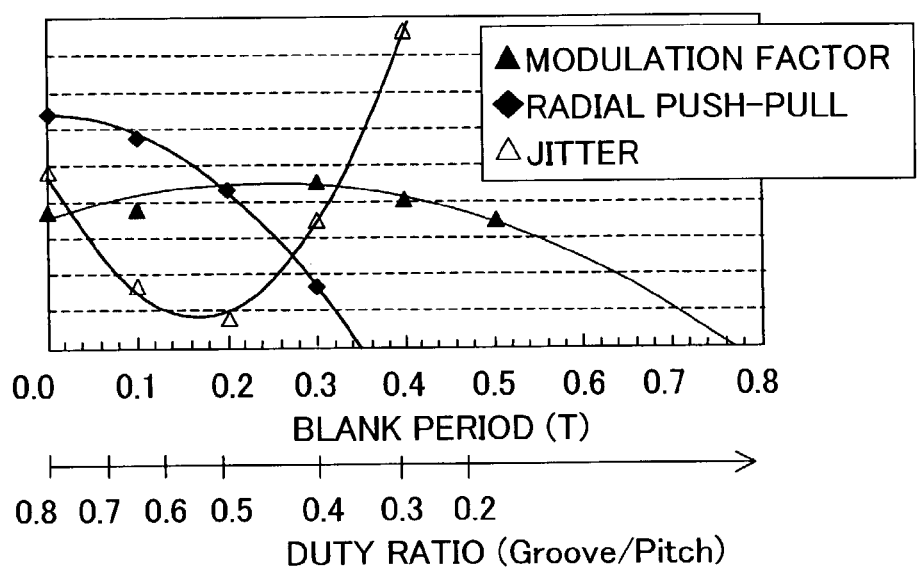
FIG. 16A shows the change of modulation factor, the change of jitter, and the change of radial push-pull with respect to the blank period obtained when middle size in-groove pits are formed.
Figure 16B:
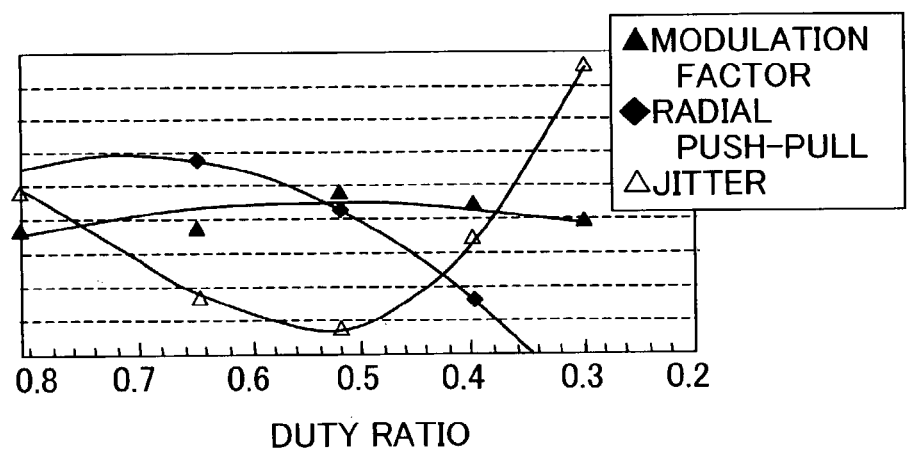
FIG. 16B shows the relationship between the duty ratio and the change of modulation factor, the change of jitter, and the change of radial push-pull as shown in FIG. 16A.

FIGS. 15A to 15C show the change of the modulation factor, the change of the jitter, and the change of the radial push-pull in the 3T signal-recorded portion obtained when the blank period was variously changed respectively. FIG. 16A collectively shows the change of the modulation factor, the change of the jitter, and the change of the radial push-pull with respect to the blank period obtained when the in-groove pit having a middle size (width in the radial direction of the optical information-recording medium of about 330 nm to 360 nm) was formed. FIG. 16B shows the relationship between the duty ratio and the change of the modulation factor, the change of the jitter, and the change of the radial push-pull shown in FIG. 16A. The duty ratio herein refers to the ratio between the actual lengths of the in-groove pit and the space (groove) adjusted to have an identical length. The duty ratio is represented by the proportion of the actual space length by which the total of the lengths of the in-groove pit and the space is occupied. In the drawings, the "large pit" indicates the data of the optical information-recording medium including the in-groove pits having large sizes (width in the radial direction of the optical information-recording medium of not less than 360 nm) formed by radiating the laser beam having a high intensity during the exposure. The "middle pit" indicates the data of the optical information-recording medium including the in-groove pits having middle sizes formed by radiating the laser beam having an intermediate intensity during the exposure. The "small pit" indicates the data of the optical information-recording medium including the in-groove pits having small sizes (width in the radial direction of the optical information-recording medium of not more than 330 nm) formed by radiating the laser beam having a low intensity during the exposure. The optical information-recording media were used as samples which were obtained such that a dye layer was formed to have a film thickness of 200 nm on each of the three types of substrates by means of the spin coat method. An Ag reflective layer having a film thickness of 100 nm was subsequently formed on the dye layer by means of the sputtering in the same manner as in the first embodiment, and a dummy substrate was stuck onto the Ag reflective layer by the aid of an ultraviolet-curable resin as described above.

As shown in FIG. 15A, as for the modulation factor of the signal read from the optical information-recording medium, the blank period, at which the modulation factor is maximum, differs depending on the pit size. As shown in FIG. 15B, as for the jitter of the signal read from the optical information-recording medium, the blank period, at which the jitter is minimum, differs depending on the pit size. Further, as shown in FIG. 15C, the radial push-pull, which is detected from the optical information-recording medium, is decreased as the blank period is increased. For example, as shown in FIG. 16A, when the pit size is the middle size, then the modulation factor is maximum, the jitter is minimum, and it is possible to obtain the sufficiently high radial push-pull when the blank period is 0.2T. On the other hand, when the pit size is the large size, the maximum modulation factor can be obtained when the blank period is 0.4T, which is not optimum because the jitter is increased. On the other hand, when the pit size is the small size, the jitter can be decreased when the blank period is zero, which is not optimum as well because the modulation factor is also lowered in accordance therewith. Therefore, when the in-groove pit of 3T is formed, it is optimum that the pit size of the in-groove pit is the middle size and the blank period is 0.2T. On this condition, as shown in FIG. 16B, the duty ratio is about 0.5. It is appreciated that the in-groove pits and the spaces, which are adjusted to have the same length in the track direction, are practically formed to have approximately the same length as well. The optimum blank period changes depending on the pit length of the in-groove pit to be formed. Therefore, the optimum blank period can be determined for each pit length in accordance with the same method as described above.

Second Embodiment

Figure 17:
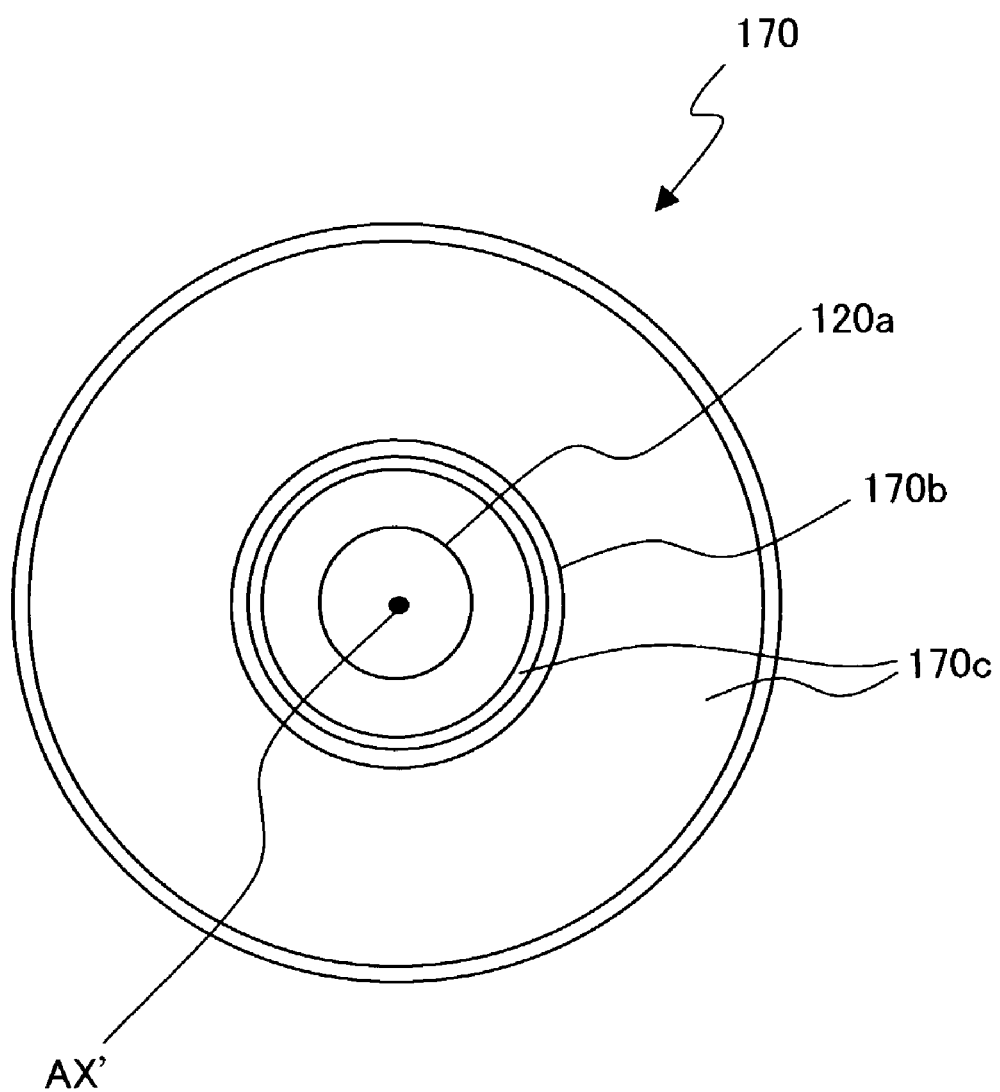
FIG. 17 shows a plan view illustrating an optical information-recording medium according to a second embodiment of the present invention.

Next, a second embodiment of the optical information-recording medium of the present invention will be explained with reference to FIGS. 17 to 19. As shown in FIG. 17, an optical information-recording medium of this embodiment was constructed in the same manner as in the first embodiment except that the preformat pattern formation area was composed of a media information-recording area 170b for recording media information and a user recording area 170c for recording user information. The media information-recording area 170b is formed with a groove having in-groove pits. The media information-recording area 170b is formed within a range of radius of 23.9 mm to 24 mm on the basis of the center AX'. On the other hand, the user recording area 170c is formed with only the groove. The user recording area 170c is formed within a range of radius of 21 mm to 23.9 mm and a range of radius of 24 mm to 58 mm on the basis of the center AX'. The groove depth in the user recording area 170c is the same as the groove depth of the portion on which the in-groove pit is not formed in the media information-recording area 170b.

Figure 18:
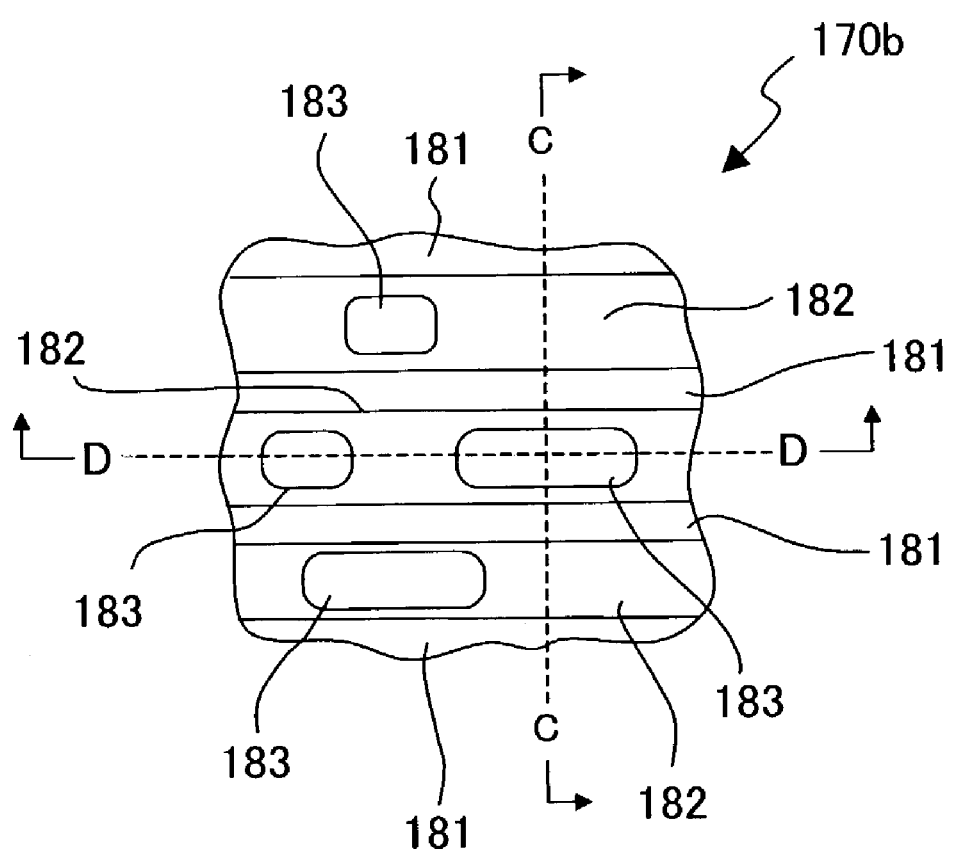
FIG. 18 shows a schematic top view illustrating an in-groove pit area of the optical information-recording medium according to the second embodiment.
Figure 19B:
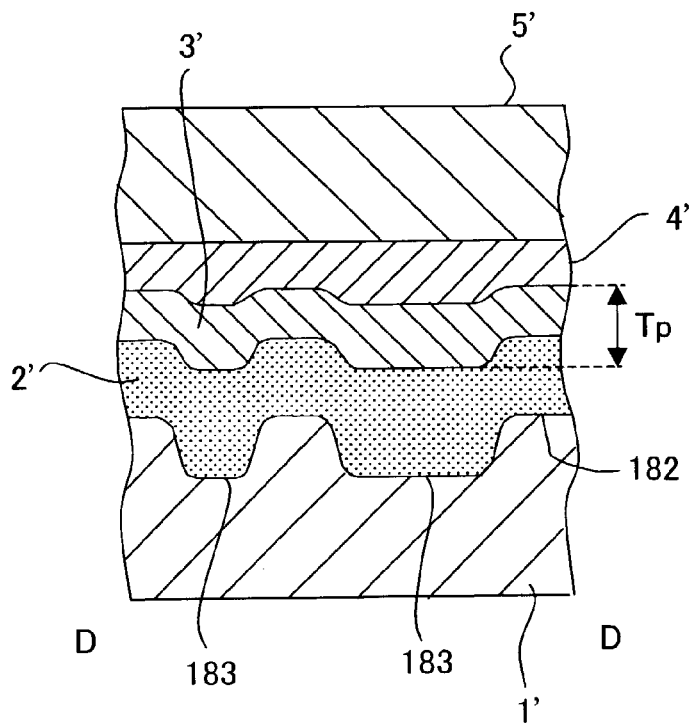
FIG. 19B shows a sectional view taken along a line D—D shown in FIG. 18.

FIG. 18 shows a schematic top view illustrating the media information-recording area 170b of the optical information-recording medium of this embodiment. FIGS. 19A and 19B show a sectional view taken along a line C—C and a sectional view taken along a line D—D shown in FIG. 18 respectively. As shown in FIG. 19A, the optical information-recording medium of this embodiment comprises a recording layer 2', a reflective layer 3', a protective layer 4', and a cover layer 5' which are formed successively on a preformat pattern formation surface of a substrate 1'. A scanning probe microscope produced by Digital Instrument was used for the optical information-recording medium to measure the maximum recess depth of the recording layer (recess depth of the recording layer ranging from the interface between the recording layer and the reflective layer on the land surface of the substrate to the interface between the recording layer and the reflective layer at the groove) Tg at the groove 182, and the maximum recess depth of the recording layer (recess depth of the recording layer ranging from the interface between the recording layer and the reflective layer on the land surface of the substrate to the interface between the recording layer and the reflective layer at the in-groove pit) Tp at the in-groove pit 183. The maximum recess depth Tg of the recording layer at the groove 182 was about 100 nm, and the maximum recess depth Tp of the recording layer at the in-groove pit 183 was about 170 nm. Accordingly, the ratio Tp/Tg=1.70 is given between the maximum recess depth Tg of the recording layer at the groove 182 and the maximum recess depth Tp of the recording layer at the in-groove pit 183. The depth dg=170 nm of the groove 182 and the depth dp=250 nm of the in-groove pit 183 are given. Therefore, the radio dp/dg=1.47 is obtained. It is appreciated that the relationship of dp/dg<Tp/Tg is satisfied. Further, it is appreciated that 1.15<(Tp/Tg)/(dp/dg) is satisfied.

The optical information-recording medium was installed to a drive unit provided with an optical pickup for emitting a laser beam having a wavelength of 650 nm to reproduce the media information recorded in accordance with the in-groove pit system on the media information-recording area. In this case, the signal modulation factor of the reproduced signal was 61%, and the jitter was 7.2%, revealing that practically sufficient recording and reproduction characteristics were provided.

Modified Embodiment 1

A modified embodiment of the second embodiment will be explained with reference to FIG. 20. As shown in FIG. 20, the optical information-recording medium of this modified embodiment is an optical information-recording medium comprising a reflective layer 3", a recording layer 2", a protective layer 4", and a cover layer 5" which are formed in this order on a preformat pattern formation surface of a substrate 1". Information is recorded and reproduced on the optical information-recording medium by radiating a recording and reproducing laser beam from the side of the cover layer 5" not from the side of the substrate 1". Also in the optical information-recording medium, the bottom surface 201a of the groove 201 and the bottom surface 202a of the in-groove pit 202 are formed to be flat. Further, the ratio between the groove depth dg' and the in-groove pit depth dp' of the substrate 1" satisfies the condition of dp'/dg'<Tp'/Tg' with respect to the ratio between the maximum recess depth of the recording layer at the groove 201 portion (recess depth of the recording layer ranging from the interface between the recording layer and the protective layer on the land surface of the substrate to the interface between the recording layer and the protective layer at the groove) Tg' and the maximum recess depth of the recording layer at the in-groove pit 202 portion (recess depth of the recording layer ranging from the interface between the recording layer and the protective layer on the land surface of the substrate to the interface between the recording layer and the protective layer at the in-groove pit) Tp'. Accordingly, it is possible to obtain the effect equivalent to that obtained in the second embodiment. The protective layer 4" is provided in order to prevent the recording layer 2" from deterioration. The protective layer 4" may be formed by sputtering a metal material such as silver or silver alloy or an inorganic dielectric material such as SiN to have a thickness of 1 nm to 10 nm, or by spin-coating, for example, an aqueous solution of 4-morpholine-2,5-dibutoxydiazonium trifluoromethane sulfanate and polyvinyl pyrrolidone. In this case, the film thickness of the protective layer 4" is preferably about 100 nm to 1 $\mu$m. The cover layer 5" protects the recording layer 2" from the mechanical shock and the chemical change. A plastic substrate having a flat surface, which is similar to the substrate 1", can be stuck by the aid of an ultraviolet-curable resin or the like.

In the embodiment described above, the photoresist, which was formed on the master disk, was exposed by radiating the laser beam continuously modulated by using the two levels of the exposure intensity of the pit level and the groove level. However, the laser beam, which has the exposure intensity at the groove level, may be firstly radiated onto the photoresist to perform the exposure with the pattern corresponding to the groove, and then the laser beam, which has the exposure intensity at the pit level, may be radiated to perform the exposure with the pattern corresponding to the groove and the in-groove pits. In the embodiment described above, the exposure intensity (third exposure intensity) was zero in the blank period. However, it is possible to use the intensity of, for example, ½, ⅓, or ¼ of the intensity (first exposure intensity) at which the groove is subjected to the exposure.

In the embodiment described above, RIE was used as the means for etching the glass master disk. However, other physical or chemical etching means may be used. A variety of etching means may be selected depending on the material of the master disk to be used, including, for example, glass and metal.

In the embodiment described above, the application condition for the dye solution was as follows. That is, the amount of application was 1 g, the number of revolutions of the substrate was 100 rpm at the start of the application, the holding time of the number of revolutions of 100 rpm was 30 seconds from the start of the application, the number of revolutions for spinning out the excessive solution was 800 to 1000 rpm, and the holding time thereof was 30 seconds. However, another application condition may be adopted provided that the recording layer can be uniformly formed to have a film thickness of 10 nm to 50 nm on the land surface of the substrate under the application condition.

In the embodiment described above, the optical information-recording medium had the single plate structure including the dummy substrate disposed on one side. However, an optical information-recording medium of the both side-stuck type may be manufactured by preparing two substrates each including a recording layer and a reflective layer formed on a preformat pattern formation surface, and sticking respective reflective surfaces thereof to one another by the aid of an adhesive layer composed of UV resin.

According to the present invention, it is possible to avoid the redundancy corresponding to the amount of the spot diameter of the laser beam in the in-groove pit by providing the blank period during the exposure of the master disk. The blank period is set on the basis of the values of the modulation factor, the jitter, and the radial push-pull of the reproduced signal resulting from the in-groove pits detected from the optical information-recording medium. Therefore, it is possible to produce the optical information-recording medium having the good recording and reproduction characteristics and the good tracking characteristics.

In the optical information-recording medium of the present invention, the media information-recording area for previously recording the media information by using the in-groove pits and the user recording area for allowing the user to record information are provided on the preformat pattern formation surface of the substrate of the optical information-recording medium. Therefore, it is unnecessary to write the media information one by one into the recording layer of the optical information-recording medium by using any exclusive recording apparatus thereafter. It is possible to simplify the steps of producing the optical information-recording medium, and consequently it is possible to reduce the production cost of the optical information-recording medium.

In the present invention, the recording layer, which contains the organic dye, is formed on the groove and the in-groove pits having the flat bottom surfaces. Therefore, unlike the case in which the media information is recorded depending on the wide width and the narrow width of the groove, it is possible to increase the difference between the height position of the recording layer at the groove portion and the height position of the recording layer at the in-groove pit portion. Further, it is possible to obtain the equivalent recess depth of the recording layer irrelevant to the difference in length of the in-groove pit in the track direction. Accordingly, the information such as the media information, which is recorded by using the in-groove pits, can be read at the high modulation factor and at the low jitter. Further, the information is recorded by using the in-groove pits not by using the wide-width portion of the groove. Therefore, it is possible to narrow the track pitch, and it is possible to increase the recording capacity.

Even if the ratio dp/dg between the in-groove pit depth dp and the groove depth dg is not formed to have the value at which the desired modulation factor and the desired radial push-pull signal are obtained, the recording layer, which contains the organic dye, is formed on the substrate so that the relationship of dp/dg<Tp/Tg is satisfied by the recess depth of the recording layer Tp at the in-groove pit portion and the recess depth of the recording layer Tg at the groove portion. Therefore, it is possible to obtain the difference in optical path length which is sufficient to reproduce the recording signal. Accordingly, it is possible to form the shallow in-groove pit depth dp with respect to the groove depth dg of the substrate. Therefore, it is easy to perform the cutting of the master disk, and it is easy to form the substrate. Accordingly, it is possible to reduce the production cost of the optical information-recording medium.

What is claimed is:

1. An optical information-recording medium comprising:
   a substrate which includes a land, a groove having a flat bottom surface, and in-groove pits having flat bottom surfaces, respectively, formed on one surface of the substrate;
   a recording layer which contains an organic dye and is formed on the one surface; and
   a reflective layer which is formed on the recording layer, wherein:
   dp/dg<Tp/Tg is satisfied provided that dg represents a depth from a land surface of the substrate to the bottom surface of the groove, dp represents a depth from the land surface of the substrate to the bottom surface of the in-groove pit, Tg represents a recess depth of the recording layer from an interface between the recording layer and the reflective layer on the land surface to the interface between the recording layer and the reflective layer at the groove, and Tp represents a recess depth of the recording layer from the interface between the recording layer and the reflective layer on the land surface to the interface between the recording layer and the reflective layer at the in-groove pit.

2. The optical information-recording medium according to claim 1, wherein the ratio Tp/Tg between the recess depth Tg and the recess depth Tp satisfies $1.6 \leq Tp/Tg \leq 2.0$.

3. The optical information-recording medium according to claim 1, wherein the depth dg satisfies $dg > \lambda/4n$ provided that $\lambda$ represents a wavelength of a light beam to be used for recording or reproduction on the optical information-recording medium, and n represents a refractive index of the substrate.

4. An optical information-recording medium comprising:
   a substrate which includes a land, a groove having a flat bottom surface, and in-groove pits having flat bottom surfaces, respectively, formed on one surface of the substrate;
   a reflective layer which is formed on the one surface;
   a recording layer which contains an organic dye and is formed on the reflective layer;
   a protective layer which is formed on the recording layer; and
   a cover layer which is formed on the protective layer, wherein:
   dp/dg<Tp'/Tg' is satisfied provided that dg represents a depth from a land surface of the substrate to the bottom surface of the groove, dp represents a depth from the land surface of the substrate to the bottom surface of the in-groove pit, Tg' represents a recess depth of the recording layer from an interface between the recording layer and the protective layer on the land surface to the interface between the recording layer and the protective layer at the groove, and Tp' represents a recess depth of the recording layer from the interface between the recording layer and the protective layer on the land surface to the interface between the recording layer and the protective layer at the in-groove pit.

5. The optical information-recording medium according to claim 4, wherein the ratio Tp'/Tg' between the recess depth Tg' and the recess depth Tp' satisfies $1.6 \leq Tp'/Tg' \leq 2.0$.

6. The optical information-recording medium according to claim 4, wherein the depth dg satisfies $dg > \lambda/4n$ provided that $\lambda$ represents a wavelength of a light beam to be used for recording or reproduction on the optical information-recording medium, and n represents a refractive index of the cover layer.

7. The optical information-recording medium according to claim 1, wherein the ratio dp/dg between the depth dg and the depth dp satisfies $1.4 \leq dp/dg \leq 1.7$.

* * * * *